(12) United States Patent
Steensen et al.

(10) Patent No.: US 12,447,027 B2
(45) Date of Patent: Oct. 21, 2025

(54) TIBIAL DUAL STYLUS INSTRUMENT HAVING WIDE CONVEX STYLUS TIPS AND COMPONENTS THEREOF

(71) Applicants: Steensen Orthopedic Systems, LLC, Hilliard, OH (US); MicroPort Orthopedics Holdings Inc., Arlington, TN (US)

(72) Inventors: Robert N. Steensen, Hilliard, OH (US); Brian R. Harris, Jr., Cordova, TN (US); Duy Q. Dang, Olive Branch, MS (US)

(73) Assignee: Steensen Orthopedic Systems, LLC, Hilliard, OH (US)

( * ) Notice: Subject to any disclaimer, the term of this patent is extended or adjusted under 35 U.S.C. 154(b) by 355 days.

(21) Appl. No.: 18/307,208

(22) Filed: Apr. 26, 2023

(65) Prior Publication Data

US 2023/0372121 A1    Nov. 23, 2023

Related U.S. Application Data

(60) Provisional application No. 63/344,113, filed on May 20, 2022.

(51) Int. Cl.
*A61B 17/15* (2006.01)
*A61F 2/46* (2006.01)

(52) U.S. Cl.
CPC ............ *A61F 2/461* (2013.01); *A61B 17/157* (2013.01); *A61F 2002/4658* (2013.01)

(58) Field of Classification Search
CPC .................................................. A61B 17/157
See application file for complete search history.

(56) References Cited

U.S. PATENT DOCUMENTS

| | | | | |
|---|---|---|---|---|
| 5,486,178 A | * | 1/1996 | Hodge | A61B 17/155 606/88 |
| 5,562,675 A | * | 10/1996 | McNulty | A61B 17/155 606/88 |
| 5,578,039 A | * | 11/1996 | Vendrely | A61B 17/157 606/88 |
| 5,768,134 A | | 6/1998 | Swaelens et al. | |
| 5,788,700 A | * | 8/1998 | Morawa | A61B 17/157 606/88 |

(Continued)

FOREIGN PATENT DOCUMENTS

WO    WO2013057514 A1    4/2013

OTHER PUBLICATIONS

Wright Medical Technology, Inc. Evolution Medial-Pivot Knee System Surgical Technique, Distal Cut First, Jul. 7, 2013, pp. 1-48, Arlington, TN, USA.

(Continued)

*Primary Examiner* — David W Bates
(74) *Attorney, Agent, or Firm* — Robert J. Hornung

(57) ABSTRACT

Instruments and components for improving the accuracy of resection of the proximal tibia in a kinematic alignment total knee arthroplasty ("TKA"). Instruments include an adjustable double tibial stylus instrument comprising: a first wide convex stylus tip and a second wide convex stylus tip at a second distal end of the second stylus. The wide convex stylus tips may be fixed components of the adjustable double stylus instrument, or the wide convex stylus tips may be detachable.

9 Claims, 21 Drawing Sheets

(56) References Cited

U.S. PATENT DOCUMENTS

| | | | |
|---|---|---|---|
| 6,013,081 A | 1/2000 | Burkinshaw et al. | |
| 6,059,788 A | 5/2000 | Katz | |
| 6,458,135 B1 | 10/2002 | Harwin et al. | |
| 7,374,563 B2 | 5/2008 | Roger et al. | |
| 7,686,812 B2* | 3/2010 | Axelson, Jr. | A61B 17/155 623/20.14 |
| 7,794,467 B2 | 9/2010 | McGinley et al. | |
| 8,425,524 B2 | 4/2013 | Aker et al. | |
| 8,435,246 B2 | 5/2013 | Fisher et al. | |
| 8,444,651 B2 | 5/2013 | Kunz et al. | |
| 8,591,516 B2 | 11/2013 | Metzger et al. | |
| 8,672,945 B2 | 3/2014 | Lavallee et al. | |
| 8,734,453 B2 | 5/2014 | Tuttle et al. | |
| 8,740,910 B2 | 6/2014 | McMillen et al. | |
| 8,974,459 B1 | 3/2015 | Axelson, Jr. et al. | |
| 9,017,334 B2 | 4/2015 | Carroll et al. | |
| 9,113,957 B2 | 8/2015 | Axelson, Jr. et al. | |
| 9,855,057 B2 | 1/2018 | Axelson, Jr. et al. | |
| 10,130,375 B2 | 11/2018 | Yager et al. | |
| 11,246,603 B2 | 2/2022 | Steensen et al. | |
| 2003/0100906 A1* | 5/2003 | Rosa | A61B 17/157 606/86 R |
| 2003/0100907 A1* | 5/2003 | Rosa | A61B 17/1675 606/86 R |
| 2003/0130665 A1* | 7/2003 | Pinczewski | A61B 17/154 606/88 |
| 2005/0143746 A1* | 6/2005 | Steffensmeier | A61B 17/157 606/88 |
| 2007/0173851 A1* | 7/2007 | McMillen | A61B 90/06 606/87 |
| 2008/0161815 A1 | 7/2008 | Schoenefeld et al. | |
| 2009/0112212 A1* | 4/2009 | Murray | A61B 17/157 606/87 |
| 2009/0264890 A1* | 10/2009 | Duggineni | A61B 17/157 606/88 |
| 2010/0121334 A1 | 5/2010 | Couture et al. | |
| 2010/0217338 A1 | 8/2010 | Carroll et al. | |
| 2010/0268240 A1 | 10/2010 | McGinley et al. | |
| 2012/0245588 A1* | 9/2012 | Murray | A61B 17/155 606/87 |
| 2015/0045801 A1* | 2/2015 | Axelson, Jr. | A61B 17/15 606/88 |
| 2019/0046215 A1 | 2/2019 | Yager et al. | |
| 2019/0231365 A1* | 8/2019 | Steensen | A61B 17/157 |
| 2021/0244421 A1* | 8/2021 | Siccardi | A61B 17/157 |
| 2022/0096247 A1* | 3/2022 | Wang | A61F 2/461 |
| 2023/0005232 A1 | 1/2023 | Harris, Jr. | |
| 2023/0389942 A1* | 12/2023 | Firmbach | A61B 17/157 |

OTHER PUBLICATIONS

Fourcade, Olivier; European Search Report; Communication Report, Apr. 10, 2023; 1-9; European Patent Office; Munich, Germany.

* cited by examiner

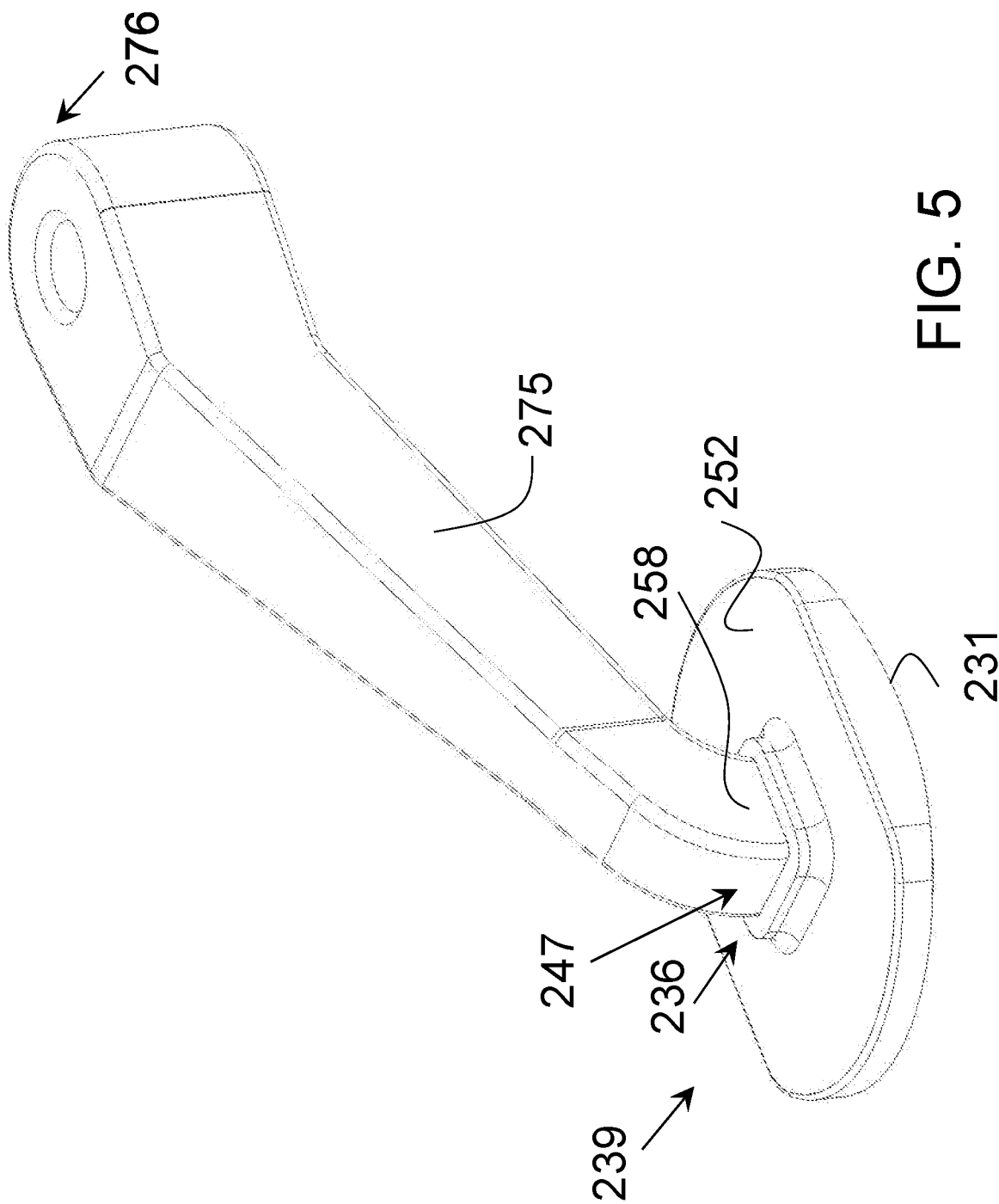

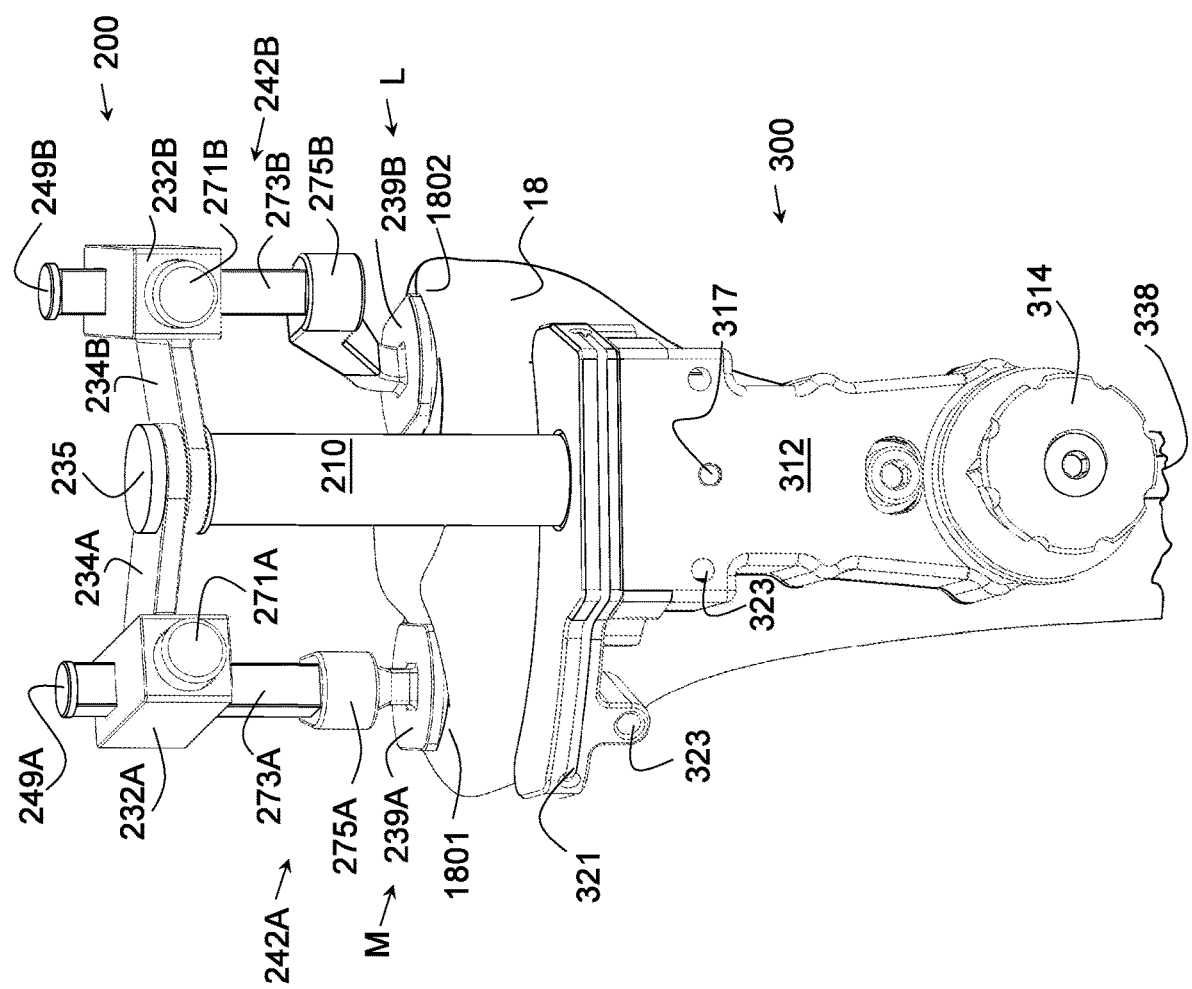

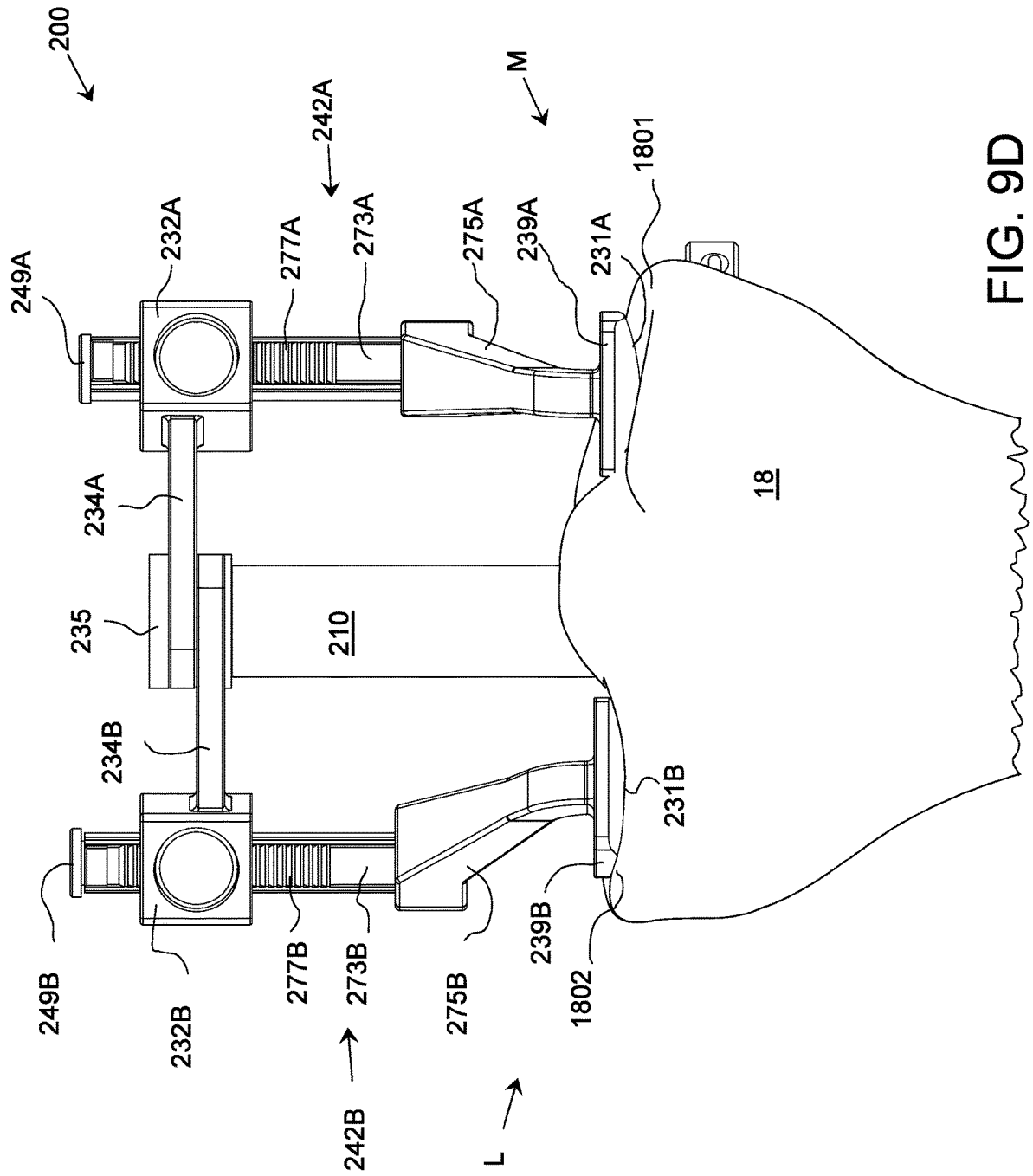

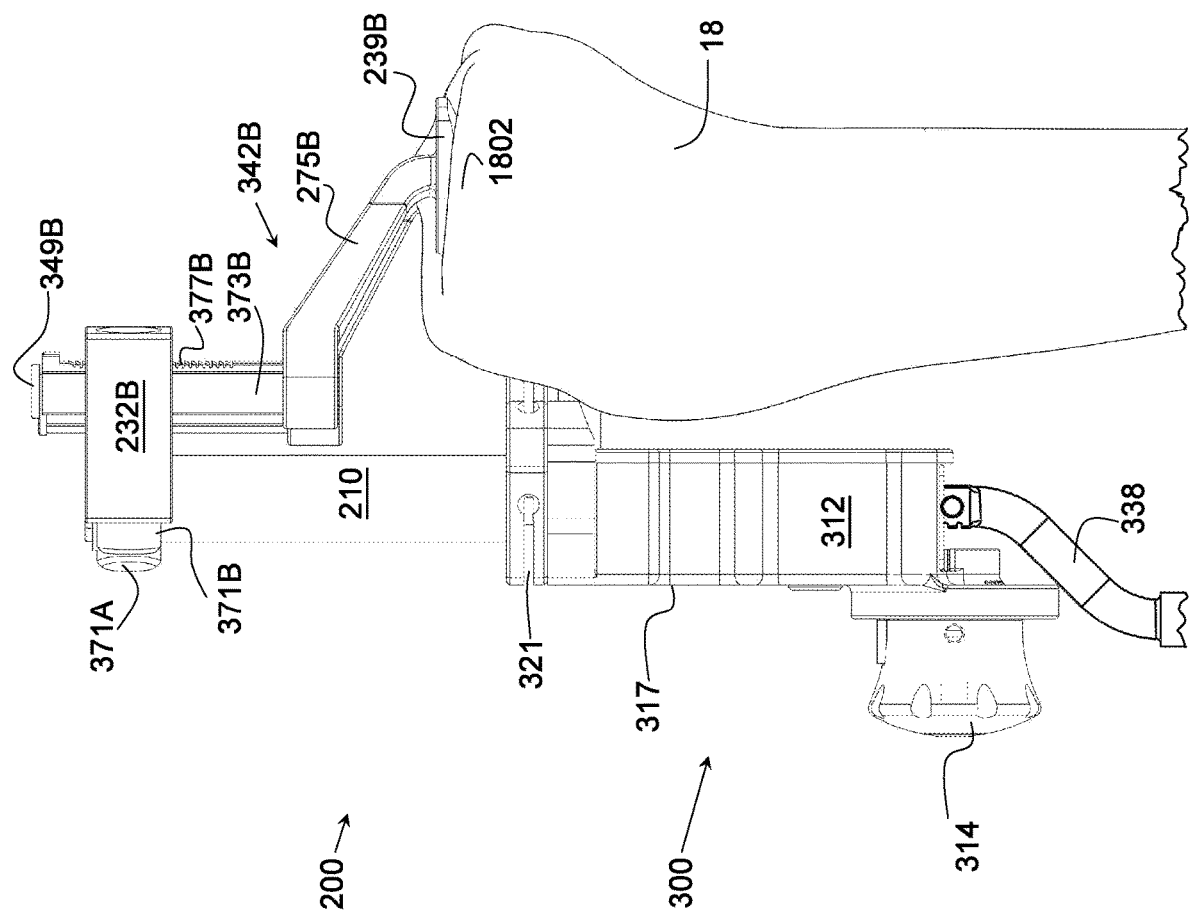

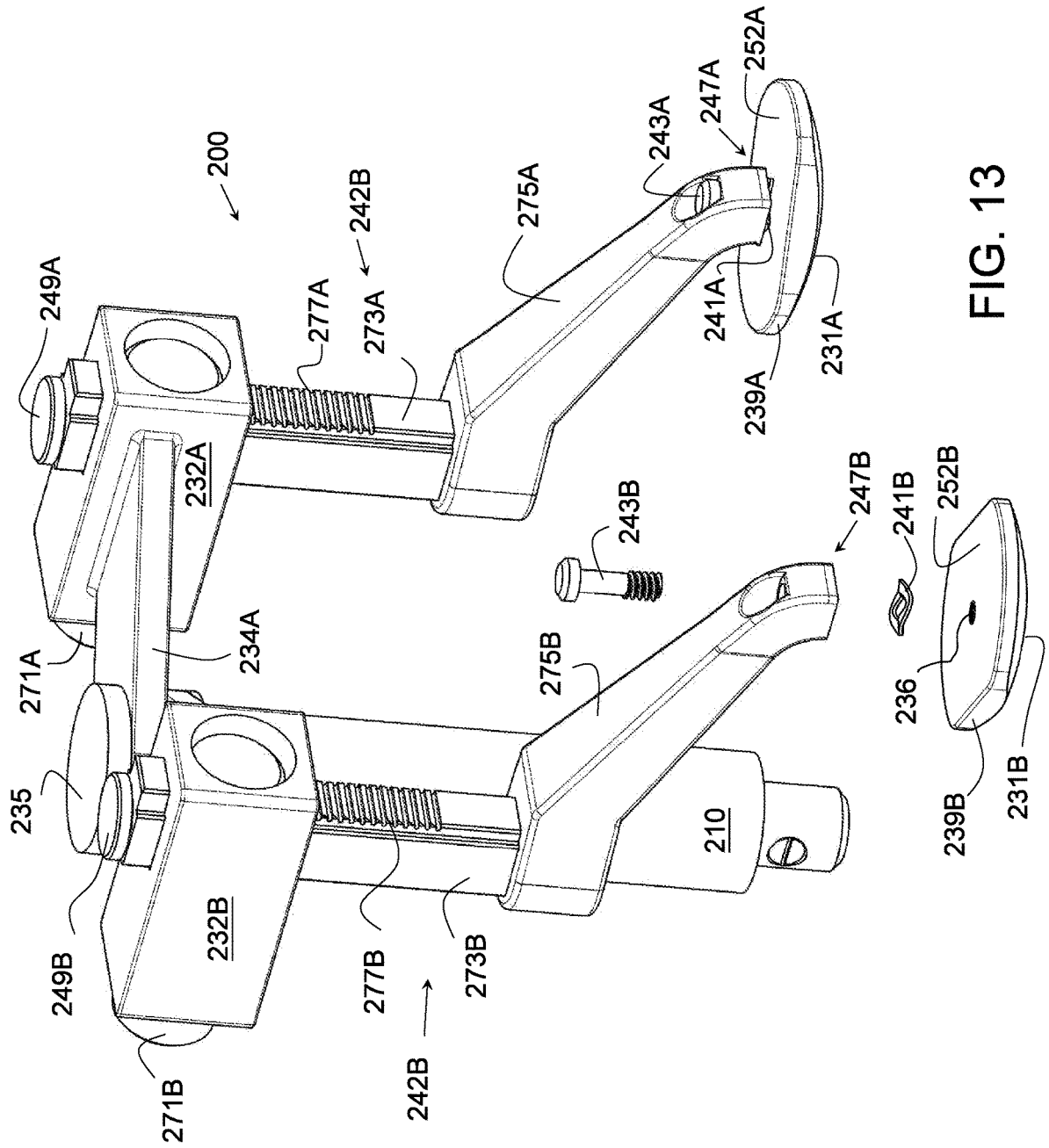

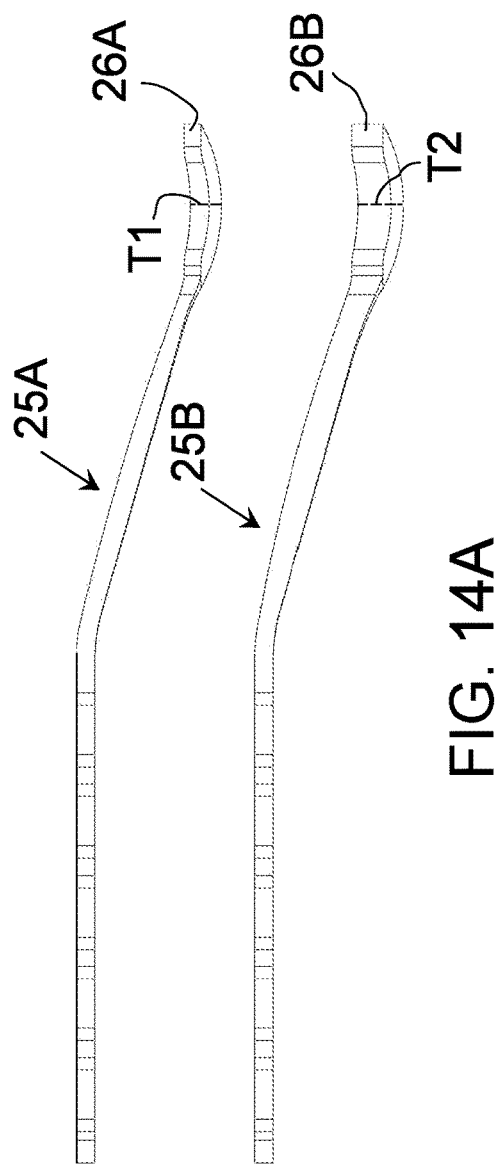
FIG. 14A
(Prior Art)
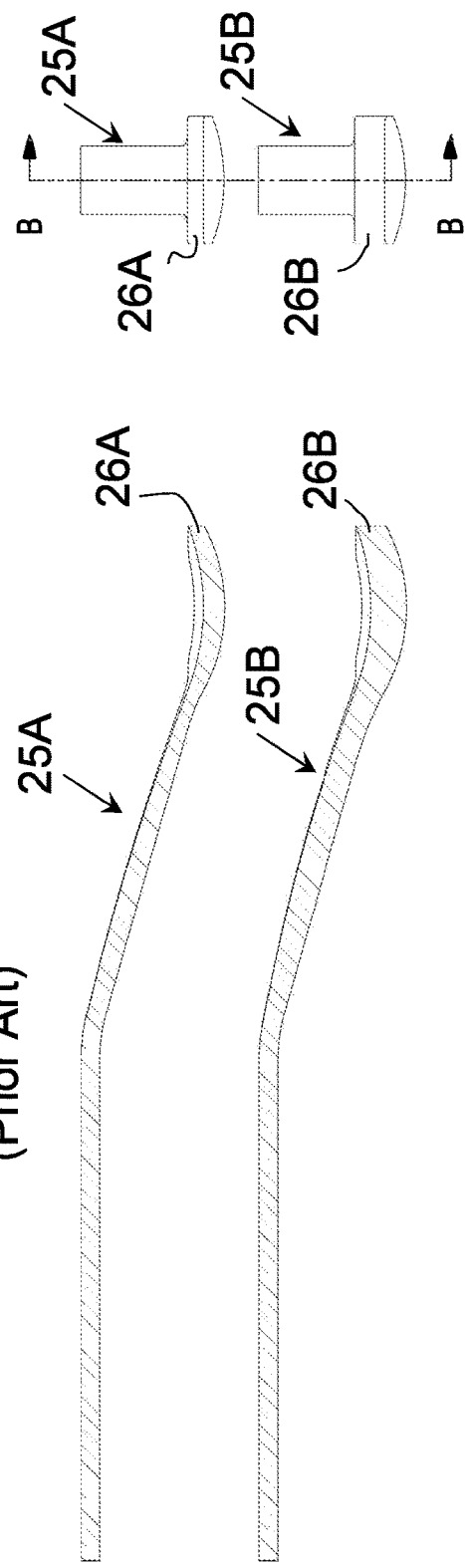
FIG. 14B
(Prior Art)
FIG. 14C
(Prior Art)

TIBIAL DUAL STYLUS INSTRUMENT HAVING WIDE CONVEX STYLUS TIPS AND COMPONENTS THEREOF

REFERENCE TO RELATED APPLICATION

This application claims the benefit of priority to U.S. Provisional Application No. 63/344,113 filed on May 20, 2022. The disclosure of this related application is hereby incorporated into this disclosure in its entirety.

BACKGROUND OF THE INVENTION

1. Technical Field

The present disclosure relates generally to the field of orthopedic surgery of the knee, and more particularly to implants, surgical implementation instruments, and methods used in total knee arthroplasties.

3. Related Art

An emerging objective of knee joint replacement surgeries is to restore the natural alignment and rotational axis of the pre-diseased joint. However, this objective can be difficult to achieve in practice because of variations in patient anatomy and because the knee joint is a complex joint that comprises not only the articulating bones but also ancillary supporting bones and a variety of soft tissue, including muscle, cartilage, ligaments, and tendons. In the traditional technique (i.e., in "mechanical alignment"), surgeons do not intentionally restore natural alignment, but rather attempt to create a perfectly straight hip-knee-ankle angle and place the joint line perpendicular to this mechanical axis. In an alternative traditional technique, known as "anatomic alignment," surgeons estimate alignment angles and other dimensions based on averages derived from a sample of the population. However, these averages often failed to account for natural variation in the patient's specific anatomy, particularly when the patient suffered from chronic bone deforming diseases like osteoarthritis.

To address this, orthopedic surgeons pioneered a patient-specific procedure designed to ascertain the location of the patient's specific pre-diseased joint line, and to place an endoprosthetic implant at a location in the knee that would restore the patient's specific pre-diseased joint line. This patient-specific technique is commonly referred to as the "kinematic alignment technique." An example kinematic alignment technique is provided in U.S. patent application Ser. No. 16/258,340, the entirely of which is incorporated herein by reference. A surgeon performing kinematic alignment can account for the articular cartilage on each condyle of the exposed distal end of the femur. Based on these measurements, the surgeon may then adjust resection guide locator instruments to set the level of a resection guide that will be used to direct the distal femoral resection. Adjusting the resection guide instrumentation based on these measurements allows the surgeon to resect the distal femur at the level appropriate to restore the native, pre-arthritic joint line. A sizing guide is then typically placed on the resected surface of the distal femur. The sizing guide can be used to determine the size of the implant to be placed. The sizing guide can also be used to position the implant in the anterior-posterior position and to set the rotation of the implant relative to the femur. A four-in-one cutting block can then be placed on the resected distal femoral surface to permit the surgeon to make the anterior, posterior, anterior chamfer and posterior chamfer resections. An appropriately sized trial implant may then be temporarily affixed to the resected distal femur.

After the distal femur has been fully resected, the surgeon uses instrumentation to measure the femorotibial gap between the distal femur and the proximal tibial plateau. The endoprosthetic implant will ultimately be placed in and fill the femorotibial extension gap. An endoprosthetic implant typically has a femoral component, a tibial component, and a polyethylene insert (sometimes called a "tibial insert") disposed between the femoral and tibial components. Many endoprosthetic knee implants are about 10 millimeters ("mm") in thickness. To orient the tibial component, the tibial plateau is generally resected at an angle parallel to the distal femoral resection when the medial and lateral ligaments are properly tensioned.

To achieve this, the surgeon may use a tibial resection guide having one or more stylus attachments. The length of each stylus relative to the tibial resection guide is set to equal the measured aspects of the femorotibial extension gap. That is, a length of a medial stylus relative to the tibial resection guide is set to the measurement of the medial extension gap. Likewise, a length of a lateral stylus relative to the tibial resection guide is set to the measurement of the lateral extension gap. The pointed tip of each stylus is then placed upon a portion of respective exposed tibial hemi-plateaus. The placement of the appropriately adjusted styli relative to the tibial resection guide had been thought to place the tibial resection guide at level parallel to the level of distal femoral resection and at a distance from the distal femoral resection appropriate to accommodate the endoprosthetic knee implant.

SUMMARY OF THE INVENTION

However, it has been discovered that the styli of the prior art permits variability in setting the level of tibial resection relative to where precisely the styli are placed on the tibial hemi-plateaus. Without being bound by theory, it is contemplated that the fine, pointed tips of prior styli may have permitted surgeons to transfer the measurements of the femorotibial gap inaccurately to the tibial resection guide. It is further contemplated that such potential for variability creates opportunity for imprecise resection of the proximal tibia. Because the endoprosthetic implant is designed to fit into an appropriately resected femorotibial extension gap, imprecise resection of the proximal tibia (e.g., by under resection or over resection) can lead to improper restoration of the patient's natural pre-diseased joint line. The potential for variability can be compounded by the observation that every patient's anatomy is unique. That is, the topography of a tibial hemi-plateau differs not only among different patients but also between the patient's own tibial hemi-plateaus. Therefore, the topography of a tibial hemi-plateau demonstrates many variations in height with high spots and low spots.

The problem of imprecise resection of the proximal tibia using a narrow, pointed stylus tip is mitigated by a wide convex stylus tip comprising a length, a width, and a tip distal surface, wherein the tip distal surface has a convex shape, and wherein the length and the width are greater than a stylus member minimum length or a stylus member minimum width taken along a transverse plane.

Without being bound by theory, it is contemplated that one or more exemplary embodiments in accordance with the present disclosure can reference a more representative area of the irregular surface area of the tibial plateau, which may substantially reduce the opportunity for imprecise resection of the proximal tibia.

It is further contemplated that certain exemplary embodiments of the wide convex stylus tip may comprise a bottom convex surface that generally resembles the curvature profile of a distal femoral condyle. Without being bound by theory, it is contemplated that replicating or resembling the curvature of a distal femoral condyle may permit a more accurate transfer of reference measurements, which may substantially reduce the risk of imprecise referencing leading to imprecise resection of the proximal tibia.

It is further contemplated that certain exemplary embodiments in accordance with the present disclosure may contribute to a reduction in procedure time compared with procedures that use traditional styli.

BRIEF DESCRIPTION OF THE DRAWINGS

The foregoing will be apparent from the following more particular description of exemplary embodiments of the disclosure, as illustrated in the accompanying drawings. The drawings are not necessarily to scale, with emphasis instead being placed upon illustrating the disclosed embodiments.

FIG. 5 is a perspective view of the exemplary selectively removable convex stylus tip of FIG. 4 in an engaged position with a portion of the first stylus member.

FIG. 9A is a perspective view of an exemplary adjustable tibial dual stylus instrument selectively engaged to a pivoting tibial resection guide assembly.

FIGS. 9B-9F are alternative views of portions of the exemplary embodiment depicted in FIG. 9A.

FIG. 9B further illustrates the tibia, stem, and a securing apparatus that fits securely around the patient's leg below the operative area.

FIG. 9C is a cross-sectional view an exemplary wide convex stylus tip taken along parasagittal plane A-A from FIG. 9B.

FIG. 9D is a posterior view of an exemplary tibial dual stylus instrument.

FIG. 9E is a side view of an exemplary tibial dual stylus instrument.

FIG. 9F is a cross-sectional side view of the exemplary tibial dual stylus instrument of FIG. 9E that is shown bisected along a sagittal plane.

FIG. 13 is a perspective side view of another exemplary embodiment of adjustable tibial dual stylus instrument comprising selectively engageable rotatable wide convex stylus tips.

FIG. 14A is a side view of two gap measurement instruments that may be provided in a surgical kit.

FIG. 14B is a front view of the measurement end of the gap measurement instruments of FIG. 14A.

FIG. 14C is a cross-sectional side view of the gap measurement instruments of FIGS. 14A and 14B taken along the line B-B.

DETAILED DESCRIPTION OF THE PREFERRED EMBODIMENTS

Figure 1:
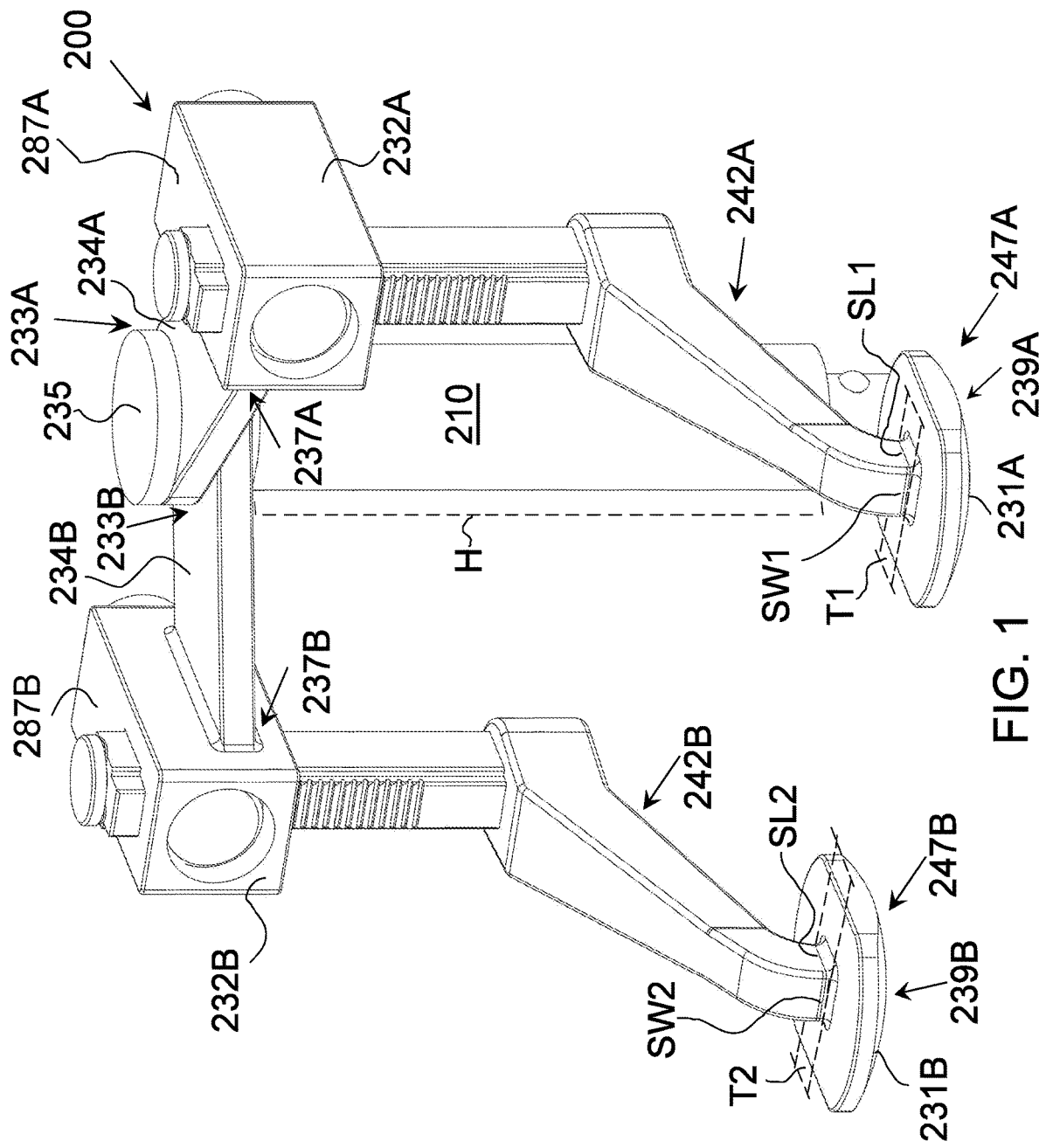
FIG. 1 is a perspective view of an exemplary tibial adjustable dual stylus instrument.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Similar reference characters indicate corresponding parts throughout the several views unless otherwise stated. Although the drawings represent embodiments of various features and components according to the present disclosure, the drawings are not necessarily to scale and certain features may be exaggerated to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as such circumstances require; (b) the singular terms "a," "an," and "the," as used in the specification and the appended claims include plural references unless the context clearly dictates otherwise; (c) the antecedent term "about" applied to a recited range or value denotes an approximation with the deviation in the range or values known or expected in the art from the measurements; (d) the words, "herein," "hereby," "hereto," "hereinbefore,"

and "hereinafter," and words of similar import, refer to this specification in its entirety and not to any particular paragraph, claim, or other subdivision, unless otherwise specified; (e) descriptive headings are for convenience only and shall not control or affect the meaning of construction of part of the specification; and (f) "or" and "any" are not exclusive and "include" and "including" are not limiting. Further, the terms, "comprising," "having," "including," and "containing" are to be construed as open-ended terms (i.e., meaning "including but not limited to").

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether explicitly described.

To the extent necessary to provide descriptive support, the subject matter and/or text of the appended claims are incorporated herein by reference in their entirety.

Recitation of ranges of values herein are merely intended to serve as a shorthand method of referring individually to each separate value falling within the range of any subranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range of sub range thereof, is included herein unless the context clearly dictates otherwise. All subranges are also included. The upper and lower limits of these smaller ranges are also included therein, subject to any specifically and expressly excluded limit in the stated range.

The terms, "horizontal" and "vertical" are used to indicate direction relative to an absolute reference, i.e., ground level. However, these terms should not be construed to require structure to be absolutely parallel or absolutely perpendicular to each other. For example, a first vertical structure and a second vertical structure are not necessarily parallel to each other.

Throughout this disclosure and unless otherwise noted, various positional terms, such as "distal," "proximal," "medial," "lateral," "anterior," and "posterior," will be used in the customary manner when referring to the human anatomy. More specifically, "distal" refers to the area away from the point of attachment to the body, while "proximal" refers to the area near the point of attachment to the body. For example, the distal femur refers to the portion of the femur near the tibia, whereas the proximal femur refers to the portion of the femur near the hip. The terms, "medial" and "lateral" are also essentially opposites. "Medial" refers to something that is disposed closer to the middle of the body. "Lateral" means that something is disposed closer to the right side or the left side of the body than to the middle of the body. Regarding, "anterior" and "posterior," "anterior" refers to something disposed closer to the front of the body, whereas "posterior" refers to something disposed closer to the rear of the body."

"Varus" and "valgus" are broad terms and include without limitation, rotational movement in a medial and/or lateral direction relative to the knee joint.

The term, "mechanical axis" of the femur refers to an imaginary line drawn from the center of the femoral head to the center of the distal femur at the knee.

The term, "anatomic axis" refers to an imaginary line drawn lengthwise down the middle of femoral shaft or tibial shaft, depending upon use.

During a primary total knee arthroplasty ("TKA"), the surgeon typically makes a generally vertical medial parapatellar incision of about five to six inches in length on the anterior or anteromedial aspect of the knee.

The surgeon continues to incise the fatty tissue to expose the anterior or anteromedial aspect of the joint capsule. The surgeon may then perform a medial parapatellar arthrotomy to pierce the joint capsule. A retractor may then be used to move the patella generally laterally (roughly about 90 degrees) to expose the distal condyles of the femur and the cartilaginous meniscus resting on the proximal tibial plateau. The surgeon then removes the meniscus and uses instrumentation to measure and resect the distal femur and proximal tibia to accommodate trial implants.

The kinematic alignment technique typically begins when the surgeon measures thickness of any remaining hyaline articular cartilage on the exposed femoral condyles. Any number of ways can be used to measure the cartilage thickness. One such example includes the use of a cartilage thickness gauge, such as the one described in U.S. patent application Ser. No. 16/258,340.

Figure 6A:
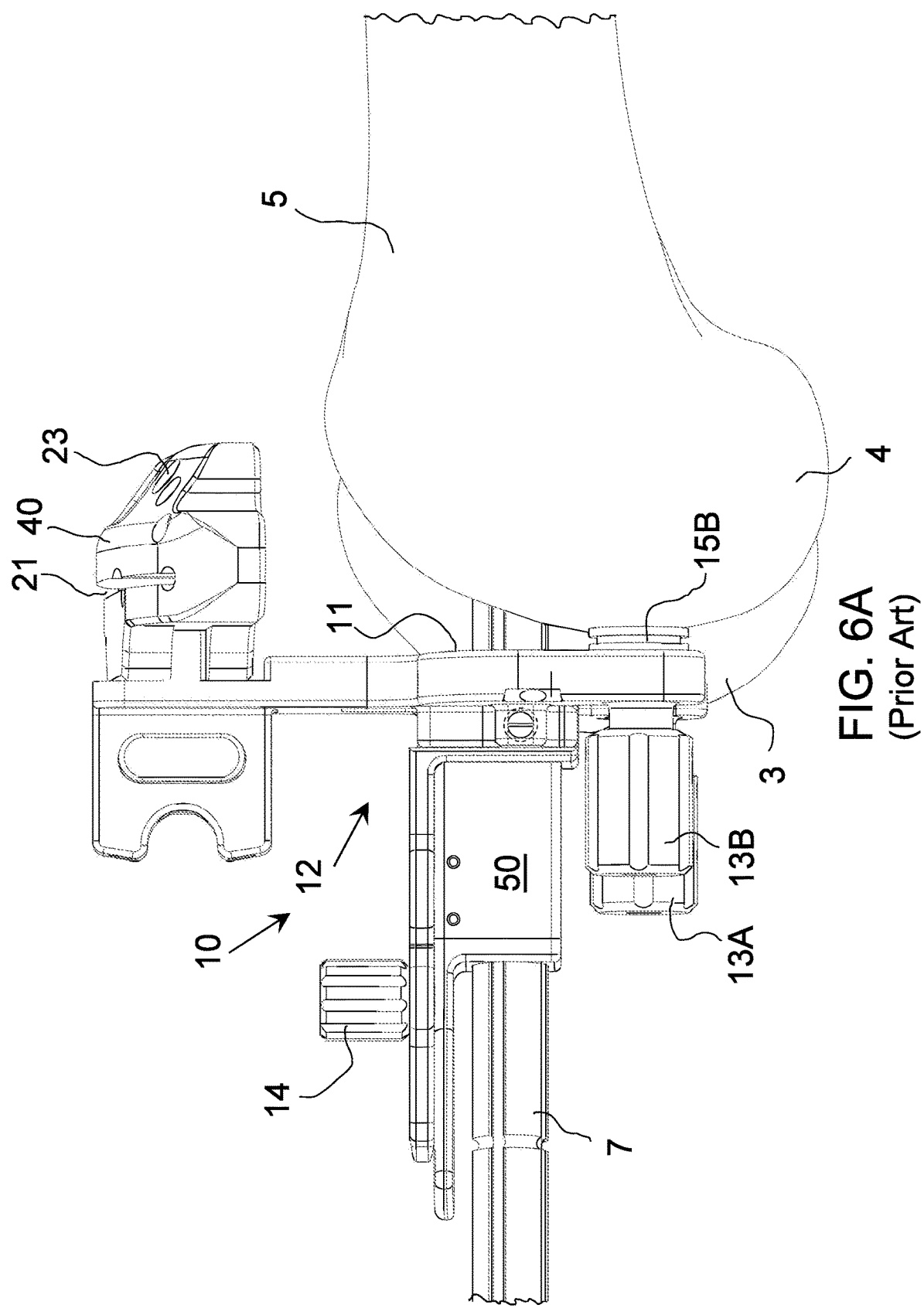
FIG. 6A is a side view of a pivoting femoral resection guide locator instrument with the accompanying resection guide disposed adjacent to a distal femur.

FIG. 6A depicts a pivoting femoral resection guide locator 10 that can be used in conjunction with measuring and resecting the distal femur 5. The pivoting femoral resection guide locator 10 can be especially suited for kinematic alignment techniques. In practice, once the distal aspect of the femur 5 has been exposed, the surgeon may use a surgical drill to enter the intramedullary canal down roughly the center of the distal femur 5. An intramedullary rod 7 may then be inserted into the evacuated intramedullary canal. The intramedullary rod 7 functions as a stable frame relative to the distal femur 5 from which instrumentation can be secured temporarily. Because the intramedullary rod 7 is secured in the femur, any movement of the femur likewise moves the exposed end of the intramedullary rod 7 in the same manner. Therefore, any instruments that are temporarily affixed to the exposed end of the intramedullary rod 7 will have the same position relative to the distal femur 5 regardless of any movement of the distal femur 5 during surgery. Once the intramedullary rod 7 is securely seated in the distal femur 5, a stable portion 50 of the pivoting femoral resection guide locator 10 can be slid onto the exposed end of the intramedullary rod 7 such that adjustment pads 15A, 15B are disposed adjacent to the medial condyle 3 and lateral condyle 4 of the distal femur 5 respectively.

Figure 6B:
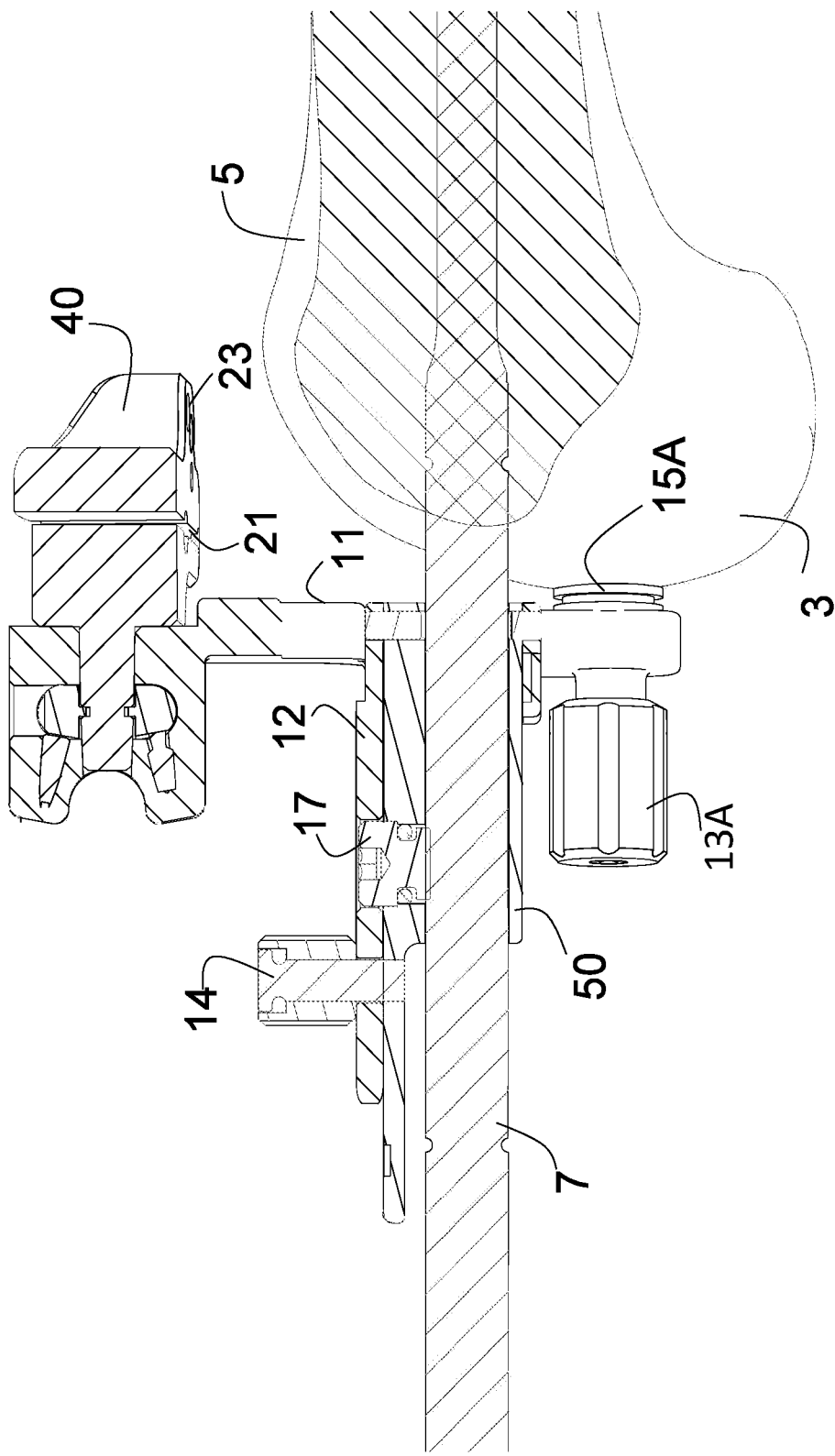
FIG. 6B is a side view of the pivoting femoral resection guide locator instrument with the accompanying resection guide of FIG. 6A bisected along a sagittal plane.

The stable portion 50 can be an intramedullary rod holder member, or other device configured to be secured to a fixed position relative to a pivoting body portion 12. The body portion 12 is configured to pivot relative to the stable portion 50. Referring to FIG. 6B, a pin 17 is closely fitted to and disposed in aligned annular holes in the stable portion 50 and the body portion 12 respectively and in this manner, the body portion 12 of the pivoting femoral resection guide locator 10 can be said to "configured to pivot" relative to the stable portion 50, or be said to be in a "pivoting relationship" with the stable portion 50.

The surgeon may adjust the adjustment knobs 13A, 13B of the adjustment pads 15A, 15B such that each adjustment pad 15A, 15B rests on the adjacent distal femoral condyle (i.e., the medial condyle 3 or the lateral condyle 4 as the case may be). Adjusting the distance of the surface of the adjustment pads 15A, 15B relative to the proximal surface 11 of the pivoting femoral resection guide locator 10 while the adjustment pads 15A, 15B are disposed upon at least one of the respective distal femoral condyles 3, 4 pivots the body portion 12 of the femoral resection guide locator 10 around the pin 17 relative to the stable portion 50. The surgeon can lock the position of the body portion 12 relative to the stable portion 50 using the lock knob 14.

In practice, the distance between the surface of the adjustment pads 15A, 15B and the proximal surface 11 of the femoral resection guide locator 10 is set to be the same distance as the amount of cartilage lost from the worn condyle. The thickest part of the remaining hyaline articular cartilage can be used as a proxy for measuring the amount of cartilage lost at the more wear prone areas of the condyles 3, 4. In other exemplary embodiments, the amount of articular cartilage lost can be estimated using the systems or process disclosed in U.S. patent application Ser. No. 17/835,894.

For example, if 1 millimeter ("mm") of cartilage loss is measured on the medial condyle 3, the end of the medial adjustment pad 15A will desirably rest on the medial condyle 3 and be disposed 1 mm from the proximal surface 11 of the femoral resection guide locator 10. Likewise, if 3 mm of cartilage loss is measured on the lateral condyle 4, then the end of the lateral adjustment pad 15B will desirably rest on the lateral condyle 4 and be disposed 3 mm from the proximal surface 11 of the femoral resection guide locator 10.

FIG. 6A further depicts a femoral resection guide 40 engaged to the body portion 12 of the femoral resection guide locator 10. Because the femoral resection guide 40 is engaged to the pivotable body portion 12, the pivoting of the body portion 12 relative to the stable portion 50 also causes the femoral resection guide 40 to pivot relative to the exposed distal femur 5. Stated another way, if the length of the intramedullary rod 7 is imagined to be a reference line, then the length of the resection guide 40 will be pivotably offset from the length of the intramedullary rod 7 by virtue of the body portion 12 being in pivoting relationship with the stable portion 50. The amount of extension of the medial adjustment pad 15A and the lateral adjustment pad 15B relative to the proximal surface 11 of the femoral resection guide locator 10 defines the value of the particular femoral resection guide locator pivot (i.e., resection) angle for the operative knee of a given patient.

The femoral resection guide 40 comprises a resection slot 21 and pin holes 23 extending therethrough. After the surgeon has used the femoral resection guide locator 10 to orient the femoral resection guide 40 in the desired position and orientation, the surgeon may insert fasteners (typically in the form of pins (not depicted)) through the pin holes 23 and into the underlying cortex of the distal femur 5 to fixedly secure the femoral resection guide 40 to the distal femur 5. Once fixedly secured, the surgeon may disengage the resection guide locator 10 from the femoral resection guide. The surgeon may then insert a surgical saw through the resection slot 21 to resect the distal femur 5 at the desired position and orientation (i.e., at a resection angle defined by the amount of pivot of the femoral resection guide locator).

Figure 7:
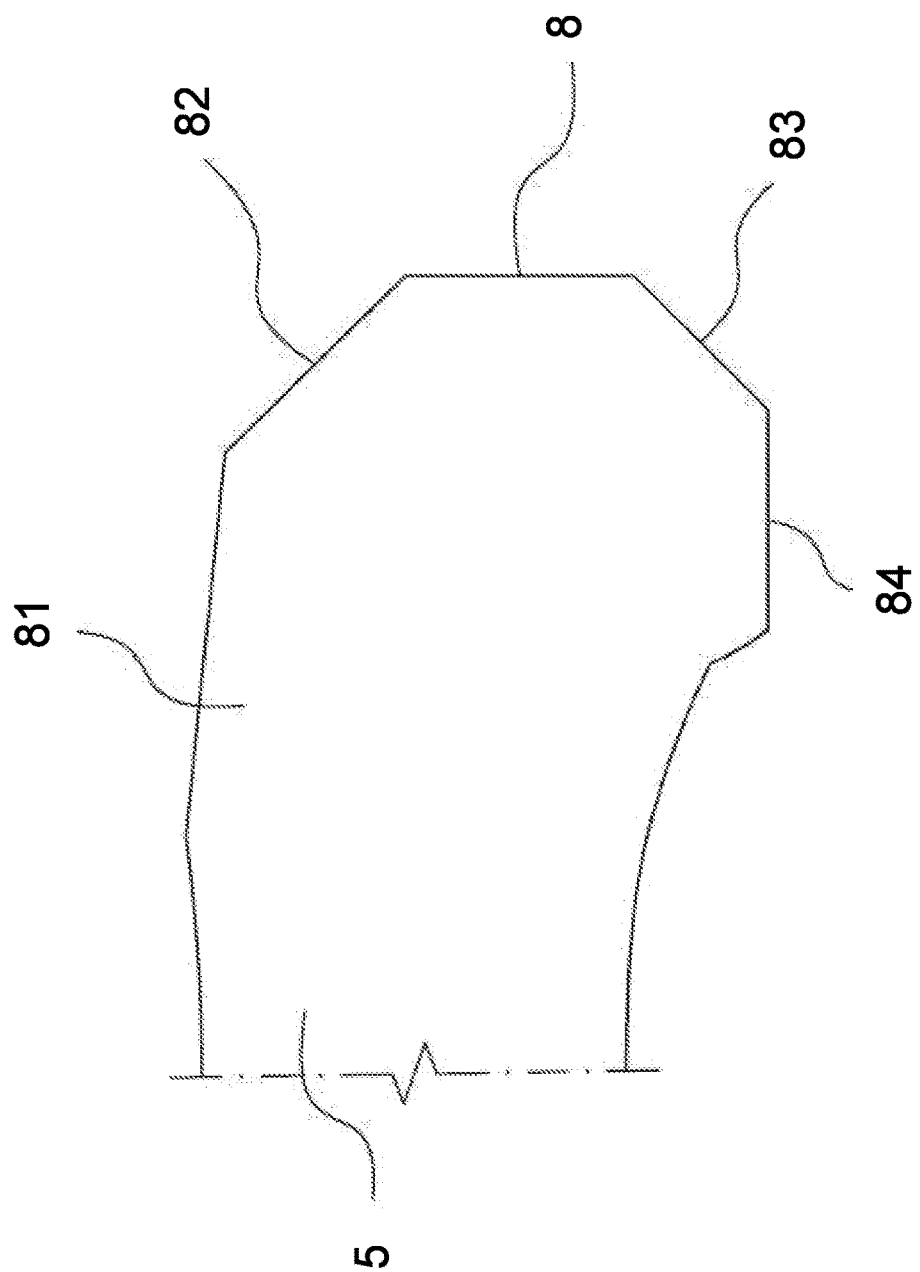
FIG. 7 is a schematic lateral view of a fully resected distal femur.

Referring to FIG. 7, using the resection slot 21 in the manner described above creates the distal resection surface 8. The surgeon may then affix a sizing guide to the distal resection surface 8 to set the location of the four-in-one cutting block. The surgeon achieves this by drilling holes into the distal resection surface 8 of the distal femur through guide holes in the sizing guide. The surgeon places pins of the four-in-one cutting block into these drilled holes. In this manner, the position of the guide holes in the sizing guide determines where the guide pins are placed and by extension, the position of the four-in-one cutting block.

The four-in-one cutting block has further resection slots through which the surgeon can insert a surgical saw to further resect the distal femur 5 by making anterior, anterior chamfer, posterior, and posterior chamfer resections to create the profile shown in FIG. 7. This "fully resected" distal femur 5 comprises an anterior resection surface 81, an anterior chamfer resection surface 82, the distal resection surface 8, the posterior chamfer resection surface 83, and the posterior resection surface 84.

Likewise, in this manner, the positioning of the guide holes of the sizing guide on the distal resection surface 8 to set the location of the four-in-one cutting block, can also be used ultimately to set the anterior-posterior position of the endoprosthetic implant and the rotation of the endoprosthetic implant relative to the femur because the femoral component of the endoprosthetic implant is ultimately positioned by being disposed on and closely fitted to the fully resected distal femur 5.

Figure 8:
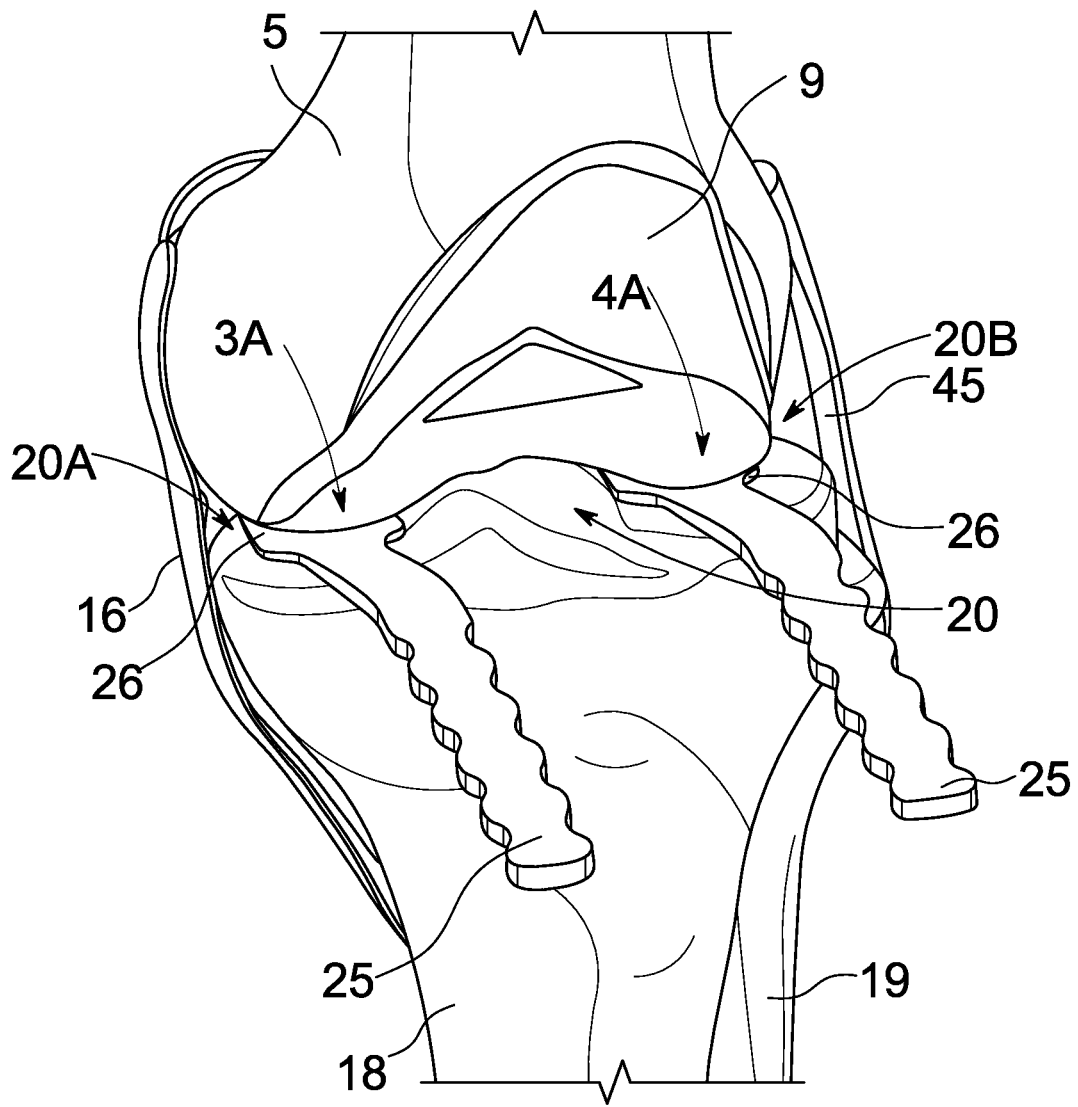
FIG. 8 is a perspective view of gap measurement instruments shown measuring the femorotibial extension gap.

FIG. 8 shows a trial femoral component of a trial implant 9 affixed to the fully resected distal femur 5. Trial implants 9 are test endoprostheses that generally have the same functional dimensions of the actual endoprostheses, but trial implants 9 are designed to be temporarily installed and removed for the purposes of evaluating the fit of the actual endoprostheses and for the purposes of evaluating the knee joint's kinematics. The medial collateral ligament ("MCL") 16 connects the medial condyle 3 of the distal femur 5 to the tibia 18. The lateral collateral ligament ("LCL") 45 connects the lateral femoral condyle 4 to the fibula 19. Gap measurement instruments 25 are inserted into the femorotibial extension gap 20 while the knee is in extension because the native knee is stable in extension. The term, "femorotibial gap" 20 is a broad term that can refer to the space between the distal end of the femur 5 and the proximal tibia 18 regardless of whether the knee is in extension (i.e., the position in which the knee is "extended" and the distal aspects of the femoral condyles are disposed across from the proximal tibial plateau) or flexion (i.e., the position in which the knee is "bent" and the posterior aspects of the femoral condyles 3, 4 are disposed across from the proximal tibial plateau). In general, the femorotibial gap 20 comprises a medial aspect (see the medial extension gap 20A) and a lateral aspect (see the lateral extension gap 20B). The femoral component of the endoprosthetic implant (represented by the trial implant 9 in FIG. 8) has distal aspects of the femoral condyles (i.e., a medial condyle 3A and a lateral condyle 4A) and posterior aspects of femoral condyles 3A, 4A that closely approximate the native femoral and posterior femoral condyles 3, 4. Therefore, it is believed that the femorotibial flexion gap should reflect the spacing of the distal femur 5 relative to the proximal tibia 18 of the natural knee even though the femorotibial extension gap 20 is measured.

Each gap measurement instrument 25 has a measurement end 26. Different gap measurement instruments 25 are typically provided in a kit. The measurement ends 26 of the different gap measurement instruments 25 generally differ in thickness (T1, T2, etc.) from the other provided gap measurement instruments 25 (see FIGS. 14A-14C).

The surgeon places gap measurement instruments 25 having measurement ends 26 of different thicknesses into the medial and lateral aspects 20A, 20B of the femorotibial extension gap 20 until the selected measurement ends 26 fit securely between the tibia 18 and the available femoral surface (which in the depicted example, is the medial and lateral condyles 3A, 4A of the trial implant 9).

The MCL and the LCL provide a tension force that resists the spreading force of the measurement end 26 of the gap measurement instruments 25. When the spreading forces provided by the measurement ends 26 are cancelled out by the tension provided by the MCL and the LCL, the knee is said to be "balanced" or "stable." This measurement technique is sometimes known as "gap balancing." Other techniques, such as the mechanical alignment technique and the anatomic alignment technique may release the MCL or LCL, which can delay recovery and increase post-operative pain.

The different thicknesses of the measurements ends 26 are desirably provided in increments of a standardized unit of measurement, such as millimeters. The measurement of the medial extension gap 20A may be different than the measurement of the lateral extension gap 20B.

FIG. 9A depicts an exemplary adjustable tibial dual stylus instrument 200 having wide convex stylus tips 239A, 239B. The exemplary adjustable tibial dual stylus instrument 200 is depicted in an engaged configuration, wherein the exemplary adjustable tibial dual stylus instrument 200 is engaged to an exemplary pivoting tibial resection guide assembly 300. Briefly, the height of the first stylus member 242A relative to the top surface 287A (FIG. 1) of the first stylus support member 232A and the height of the second stylus member 242B relative to the top surface 287B (FIG. 1) of the second stylus support member 232B are adjusted to reflect the measurements taken from the gap measurement instruments 25. That is, the stylus member 242A resting on the medial tibial hemi-plateau 1801 is set to the height of the medial extension gap 20A, while the stylus member 242B resting on the lateral tibial hemi-plateau 1802 is set to the height of the lateral extension gap 20B. The height of the medial extension gap 20A and lateral extension gap 20B can desirably be ascertained using the gap measurement instruments 25 described above. That is, and by way of example, if a patient's knee is balanced when a 2 mm medial gap measurement instrument 25 and a 3 mm lateral gap measurement instrument 25 are inserted into the medial and lateral aspects 20A, 20B of the femorotibial extension gap 20 respectively, then the proximal end 249A of the stylus member 242A disposed on the medial tibial hemi-plateau 1801 can be set to extend 10 mm from the top surface 287A of the first stylus support member 232A, which together with the marking indicia described further below (see FIG. 3), can indicate a 2 mm gap and an 8 mm tibial resection level. Likewise, the proximal end 249B of the stylus member 242B disposed on the lateral tibial hemi-plateau 1802 can be set to extend 10 mm from the top surface 287B of the second stylus support member 232B, which together with the marking indicia described further below, can indicate a 3 mm gap and a 7 mm tibial resection level. For the purposes of this disclosure, it will be appreciated that the top surface 287A of the first stylus support member 232A and the top surface 287B of the second support member 232B can be referred to as such regardless of the orientation of the exemplary adjustable tibial dual stylus instrument 200.

When the first and second wide convex stylus tips 239A, 239B in accordance with this disclosure rest upon their respective tibial hemi-plateaus 1801, 1802 and the height of each stylus member is set, the body portion 312 of pivoting tibial resection guide assembly 300 pivots around a stable portion 350 (FIG. 9F) of the tibial resection guide assembly 300. Bosses 317 extend from the stable portion and are closely fitted and aligned to holes in the pivoting body portion 312. In other exemplary embodiments, the bosses 317 can be replaced by a pin extending through the body portion 312 and the stable portion 350 such that the pin is fitted to and disposed in aligned annular holes in the stable portion 350 and the body portion 312 respectively. In either manner, the body portion 312 of the pivoting tibial resection guide assembly 300 can be configured to pivot relative to the stable portion 350 to thereby define a "tibial resection pivot point." The stable portion 350 can be disposed around and engage a stem 338 that connects to a securing apparatus 348 that fits securely around the patient's leg below the operative area.

The body portion 312 of the pivoting tibial resection guide assembly 300 further comprises a tibial resection slot or surface 321 and a pin bore 323. Adjusting the height of the first stylus member 242A relative to the first stylus support member 232A or the height of the second stylus member 242B relative to the second stylus support member 232B when the first or second wide convex stylus tips 239A, 239B rest upon the exposed tibial hemi-plateaus 1801, 1802 causes the body portion 312 of the pivoting tibial resection guide assembly 300 to pivot around the tibial resection pivot point (i.e., the bosses 317 (FIG. 9F)) extending generally transversely and sagittally from the stable portion 350 when the pivoting tibial resection guide assembly 300 is disposed in an installed configuration as depicted. Likewise, the tibial resection slot 321 and pin bore 323 pivot in the same manner because they are defined by areas of the body portion 312. Referring to FIGS. 9E and 9F, the surgeon may rotate the adjustment knob 314 to adjust the tibial resection angle manually if desired. The adjustment knob 314 is disposed on the body portion 312 but is in mechanical communication with the stable portion 350 via gears to adjust the tibial resection angle. A central button in the adjustment knob 314 can be depressed to insert a gear stopper into the adjustment gear to prevent further rotational movement around the tibial resection pivot point to thereby lock the pivoting tibial resection guide assembly 300 at the desired pivoting resection angle.

Once the tibial resection slot 321 is positioned at the desired orientation and angle, the surgeon may drill fasteners (commonly two to three pins) through the pin bores 323 to secure the tibial resection guide assembly 300 to the tibia 18 at the desired position and angle. The surgeon may then remove the adjustable tibial dual stylus instrument 200 from the tibial resection guide assembly 300 to place the tibial dual stylus instrument 200 in a disengaged configuration. With the area above the tibia 18 relatively clear, the surgeon can then use a surgical saw to resect the tibia 18 through the tibial resection slot 321 or the surgeon may use the top of the tibial resection guide assembly 300 as a guide by which to make the tibial resection. In this manner, measurements made to determine the position and orientation of the distal resection surface 8 have effectively been transferred to the tibial resection surface. In many kinematic alignment procedures, the angle of the tibial resection will be parallel to the angle of resection of the distal surface of the femur.

Figure 9B:
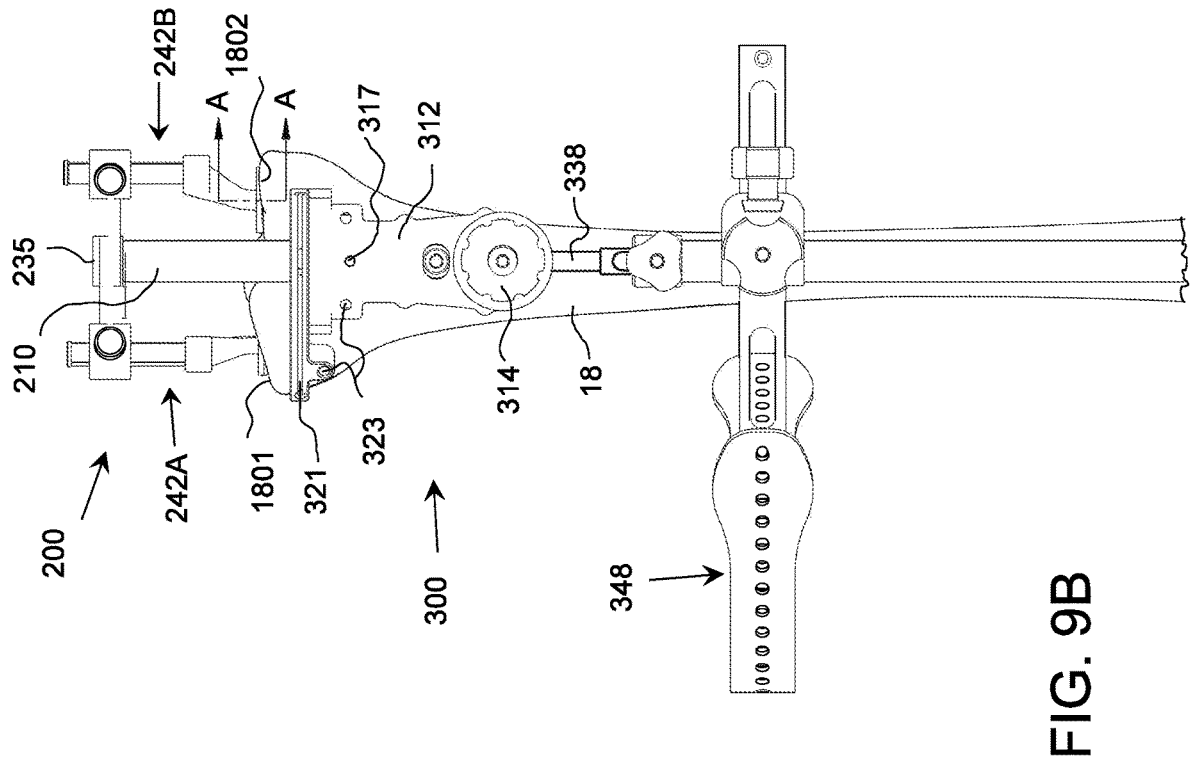
Figure 9C:
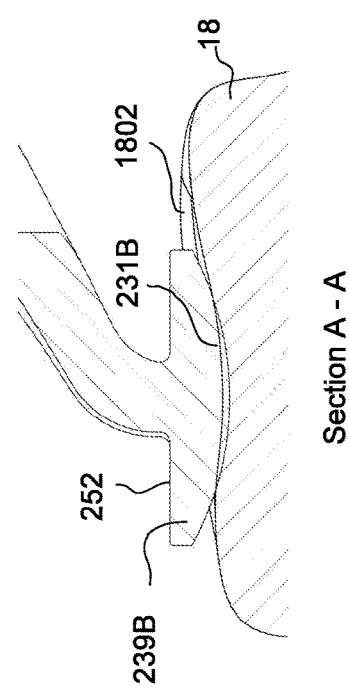
Figure 9F:
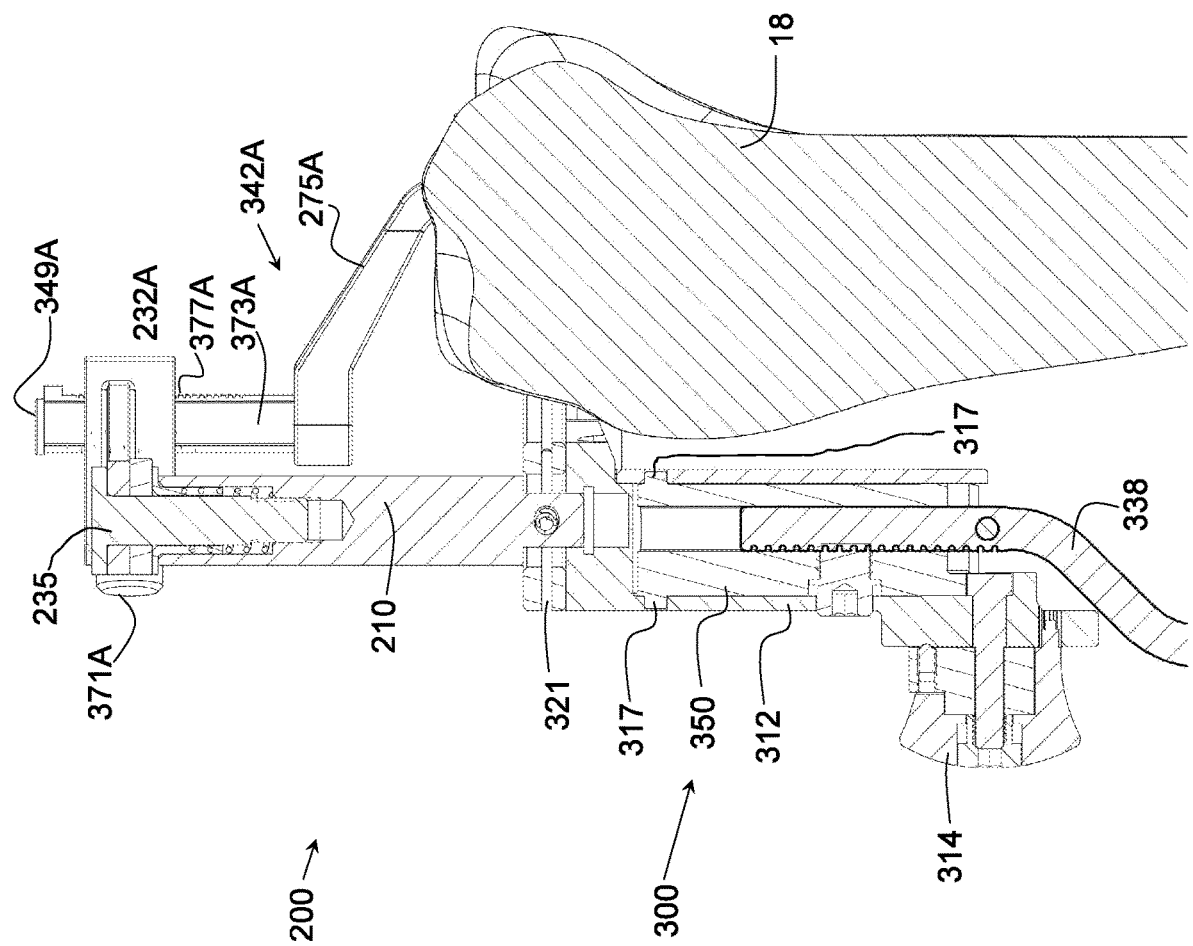

FIGS. 9B-9F are alternative views of portions of the exemplary embodiment depicted in FIG. 9A. FIG. 9B shows more of the tibia 18, the stem 338, and the securing apparatus 348 that fits securely around the patient's leg below the operative area. FIG. 9C is a cross-sectional view an exemplary wide convex stylus tip 239B taken along parasagittal plane A-A. FIG. 9D is a view of the exemplary tibial dual stylus instrument 200 from the back (i.e., a posterior view). FIG. 9E is a side view of the exemplary tibial dual stylus instrument 200. FIG. 9F is a cross sectional side view of the exemplary tibial dual stylus instrument 200 depicted in FIG. 9E.

To complete the procedure, the surgeon then removes the remainder of the tibial resection guide assembly 300. Next, the surgeon drills and/or broaches the resected tibial surface to allow for the placement of the stem or keel of the tibial component of the endoprosthetic implant. The bottom of the tibial component typically comprises a stem and/or keel that extends into the tibia distal to the tibial resected surface to add stability to the implant in the bone. The surgeon then generally inserts a trial polyethylene insert between the trial tibial tray of the tibial component and the trial femoral component to test the knee's flexion and extension, general stability, and patellar tracking on the trial implants. Once satisfied with the trial and movement characteristics, the surgeon can replace the trial femoral component with the actual femoral component of the implant. The surgeon may then use bone cement to permanently affix the tibial and femoral components to the proximal tibia and fully resected distal femur respectively. Alternatively, the surgeon may use a press-fit implant and avoid use of bone cement if desired. The surgeon can then address the patellofemoral aspect of the procedure and may then close the wound according to preference.

FIG. 1 depicts an exemplary adjustable tibial dual stylus instrument 200 having a body member 210 having a height H. The depicted embodiment is shown in the disengaged configuration. The body member 210 supports a first support arm 234A disposed thereon. The first support arm 234A has a pivoting portion 233A. The pivoting portion 233A comprises an annular surface closely disposed around a pin 235 (see also FIG. 9F). The pin 235 desirably extends into the body member 210 along a longitudinal center. This pin 235, together with the pivoting portion 233A of the first support arm 234A can be said to define a "first pivot point" of the exemplary adjustable tibial dual stylus instrument 200. It will be appreciated that in certain exemplary embodiments, multiple support arms (see 234B) can be configured to pivot around the first pivot point. The pivoting portion 233A is rotatable around the pin 235. In this manner, the first support arm 234A can be said to be "in pivoting relationship" or "configured to pivot" with the body member 210. In certain exemplary embodiments, the pivoting portion 233A may be disposed at a first end of the first support arm 234A. In other exemplary embodiments, the pivoting portion 233A may be disposed between the first end and the opposing end 273A of the first support arm 234A.

Figure 2:
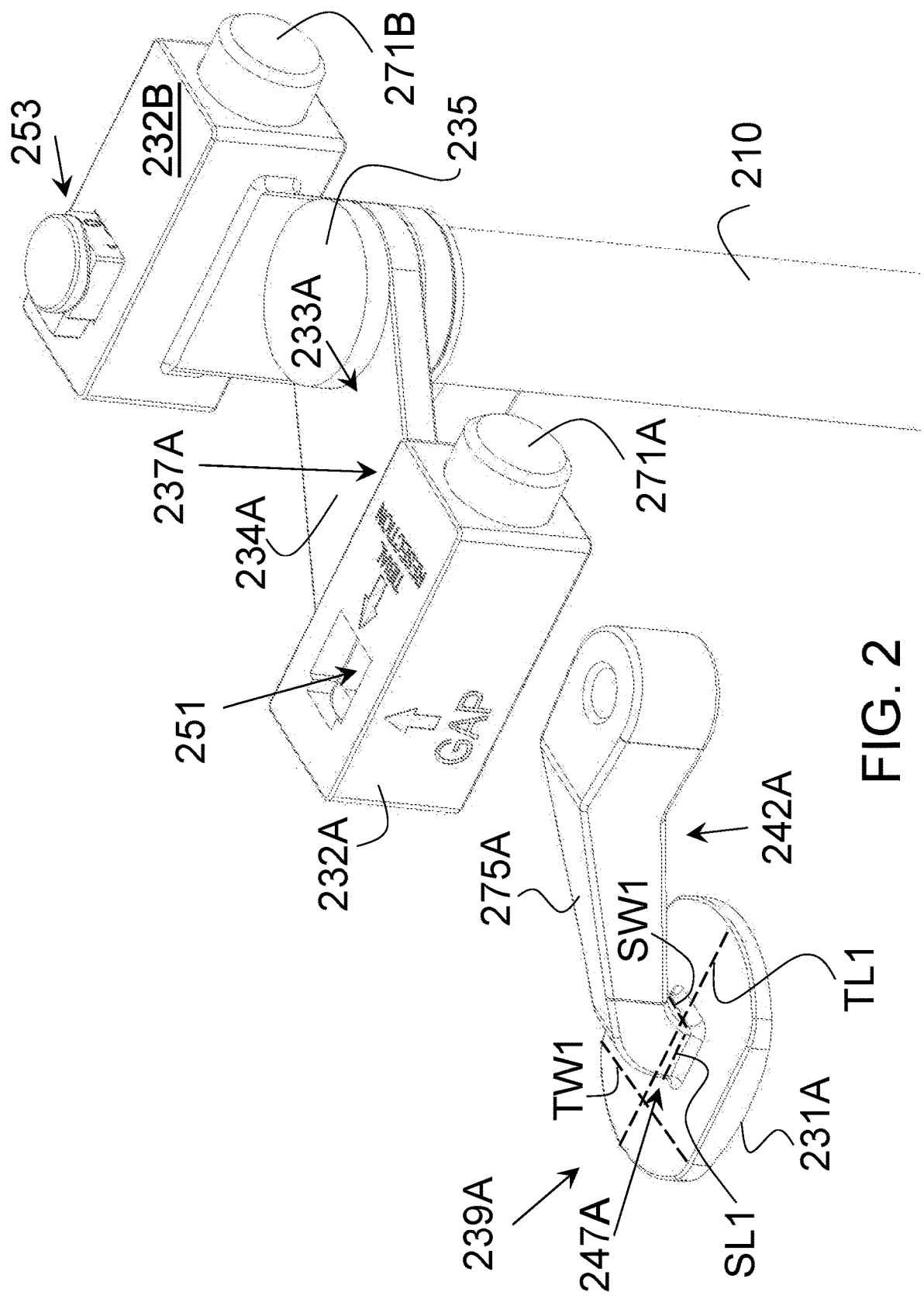
FIG. 2 is a perspective view of an exemplary tibial adjustable dual stylus instrument that further details aspects of an exemplary first stylus member.

The opposing end 237A of the first support arm 234A engages a first stylus support member 232A. The first stylus support member 232A has an area defining a first cavity 251 (FIG. 2) extending generally vertically therethrough. In the depicted exemplary embodiment, a first stylus member 242A extends through the first cavity 251 substantially parallel to the height H of the body member 210. The first stylus member 242A comprises a first wide convex stylus tip 239A at a distal end 247A of the first stylus member 242A (i.e., a first distal end of a first stylus member). The first wide convex stylus tip 239A has a first tip length TL1 (FIG. 2), a first tip width TW1 (FIG. 2), and a first tip distal surface 231A. It will be appreciated for the purposes of this disclosure that the first tip distal surface 231A can be referred to as such regardless of the orientation of the first wide convex stylus tip 239A.

The first tip distal surface 231A has a first convex shape. The first tip length TL1 and the first tip width TW1 are greater than a first stylus member minimum length SL1 or a first stylus member minimum width SW1 taken along a first transverse plane T1.

The depicted exemplary adjustable tibial dual stylus instrument 200 further comprises a second support arm 234B in pivoting relationship with the first support arm 234A. In certain exemplary embodiments, the pivoting portion 233B comprises an annular surface that is closely disposed and rotatable around the pin 235. In other exemplary embodiments, the pivoting portion 233B can be rotatable around a second pin that extends through the first support arm 234A. In either configuration, the second support arm 234B can be said to be "in pivoting relationship with" or "configured to pivot around" the first support arm 234A. In certain exemplary embodiments, the pivoting portion 233B may be disposed at a first end of the second support arm 234B. In other exemplary embodiments, the pivoting portion 233B may be disposed between the first end and the opposing end 273B of the second support arm 234B.

A second stylus support member 232B engages an opposing end 237B of the second support arm 234B. The second stylus support member 232B has an area defining a second cavity 253 (FIG. 2) extending generally vertically therethrough. In the depicted exemplary embodiment, a second stylus member 242B extends through the second cavity 253 substantially parallel to the height H of the body member 210. The distal end 247B of the second stylus member 242B comprises a second wide convex stylus tip 239B at a distal end 247B of the second stylus member 242B (i.e., a second distal end of the second stylus member).

The second wide convex stylus tip 239B has a second tip length TL2 (see FIG. 2), a second tip width TW2 (see FIG. 2), and a second tip distal surface 231B. The second tip distal surface 231B has a second convex shape. The second tip length TL2 and the first tip width TW2 are greater than a second stylus member minimum length SL2 or a second stylus member minimum width SW2 taken along a second transverse plane T2. It will be appreciated for the purposes of this disclosure that the second tip distal surface 231B can be referred to as such regardless of the orientation of the second wide convex stylus tip 239B.

Figure 3:
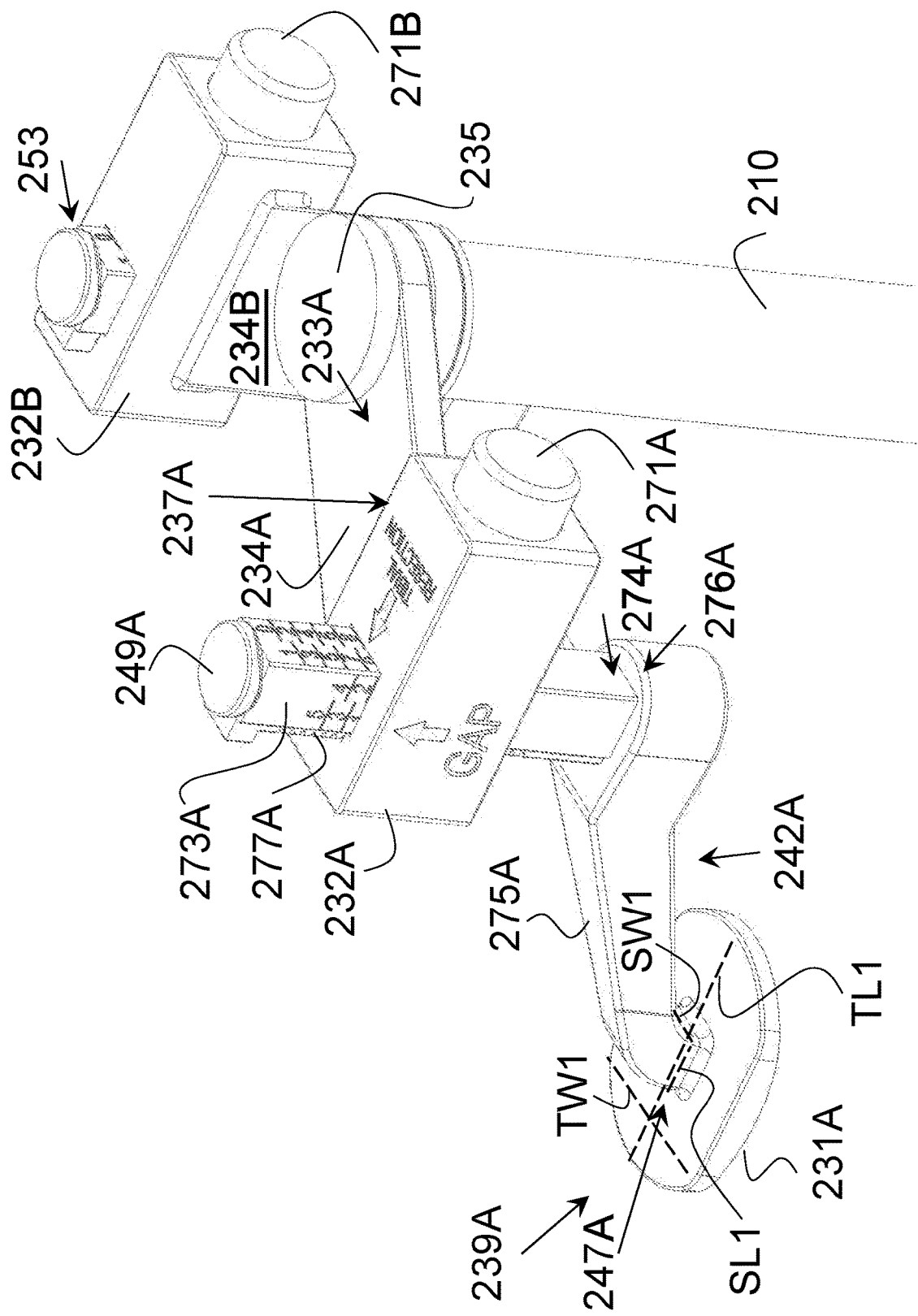
FIG. 3 is the perspective view of FIG. 2 further depicting additional elements of an exemplary first stylus member.

FIG. 3 is a perspective close up view of the first stylus member 242A (i.e., an exemplary tibial-referencing surgical stylus). It will be appreciated that the description of the first stylus member 242A in this section can also apply to the second stylus member 242B. FIG. 3 illustrates that the first stylus member 242A comprises a measurement member 273A, an anteroposterior extension member 275A, and a first wide convex stylus tip 239A. In certain exemplary embodiments, the anteroposterior extension member 275A can be omitted. In the depicted embodiment, the measurement member 273A comprises a proximal end. In the depicted embodiment the proximal end of the measurement member is the same proximal end 249A of the first stylus member 242A. The measurement member 273A further comprises a distal end 274A that is distal from the measurement member proximal end, and a ratcheting arm 277A extending between the proximal end 249A and the distal end 274A. The measurement member 273A and the ratcheting arm 277A are disposed in the first cavity 251 of the first stylus support member 232A. Depressing of the button 271A permits the proximal end 249A of the measurement member 273A to be raised or lowered relative to the top surface 287A of the first stylus support member 232A. The measurement member 273A desirably includes measurement indicia that are set at regular intervals and that are visible above the top surface 287A of the first stylus support member 232A. These measurement indica can desirably be a standard unit of measurement, such as the millimeter.

As further depicted in FIG. 3, the measurement member 273A includes a first set of measurement indicia disposed on or in the outer side of the measurement member 273A (i.e., the outer side when the exemplary tibial dual stylus instrument 200 is disposed on a patient's tibial hemi-condyles). These first set of measurement indicia indicate the thickness of the measurement ends 26 of the gap measurement instruments 25 depicted in FIGS. 8, 14A-14C, and 15A-15B. It will be appreciated that the first set of measurement indicia can be a sizing convention adopted by a particular manufacturer (e.g., a size 2 gap measurement instrument 25 can correspond to a thickness or height of the measurement end 26 of 8 mm, etc.). The measurement member 273A can further comprise a second set of measurement indicia disposed on or in an anterior side of the measurement member 273A (i.e., the anterior side when the exemplary tibial dual stylus instrument 200 is disposed on a patient's tibial hemi-condyles). This second set of measurement indicia can indicate the amount of tibial resection that corresponds to a particular size of the particular measurement instrument 25 that was used to balance the knee. The second set of measurement indicia are desirably presented in a standard unit of measurement that indicates the amount of tibial resection (e.g., millimeters).

In embodiments comprising an anteroposterior extension member 275A, the anteroposterior extension member 275A can desirably extend from a distal end 274A of the measurement member 273A. In exemplary embodiments, the distal end 274A of the measurement member 273A rotationally engages a proximal end 276A of the anteroposterior extension member 275A. This can be achieved by an area extending into the proximal end 276A of the anteroposterior extension member 275A, such that the area defines a recess that can closely receive a pin or other protrusion extending from the distal end 274A of the measurement member 273A. In other exemplary embodiments, the protrusion may extend superiorly from the proximal end 276A of the anteroposterior extension member 275A into an area defining a recess extending into the distal end 274A of the measurement member 273A. Such a recess having dimensions that receive the pin or other protrusion extending superiorly from the proximal end 276A of the anteroposterior extension member 275A. Ball and socket engagements are also considered to be within the scope this disclosure. Any such arrangement of pin or other protrusion together with the recess can be said to define a "second pivot point" of the exemplary adjustable tibial dual stylus instrument 200. In any of these manners, the distal end 274A of the measurement member 273A can be said to "rotationally engage" or be "configured to rotationally engage" the proximal end 276A of the anteroposterior extension member 275A. Likewise, in any of these manners, the proximal end 276A of the anteroposterior extension member 275A can be said to "rotationally engage" or be "configured to rotationally engage" the distal end 274A of the measurement member 273A.

The distal end 247A of the anteroposterior extension member 275A (i.e., the distal end 247A of the first stylus member 242A in the depicted embodiment) can engage the first wide convex stylus tip 239A. In exemplary embodiments lacking the anteroposterior extension member 275A, the distal end 274A of the measurement member 273A can engage the first wide convex stylus tip 239A.

For the purposes of this disclosure, it will be appreciated that the distal end 274A of the measurement member 273A and the proximal end of the measurement member 273A can be referred to as such regardless of the orientation of the measurement member 273A. Likewise, it will be appreciated that the proximal end 276 of the anteroposterior extension member 275 and the distal end 247 of the anteroposterior extension member 275 can be referred to as such regardless of the orientation of the anteroposterior extension member 275.

In certain exemplary embodiments, the stylus members 242A, 242B can be one contiguous unit. In other exemplary embodiments, the stylus members 242A, 242B can be assembled from one or more subcomponents including the measurement member 273, anteroposterior extension member 275, or wide convex stylus tip 239. In yet other exemplary embodiments, one or more stylus members 242A, 242B, etc. comprising a wide convex stylus tip 239 can be separate, independently moveable stylus members 242A, 242B, etc. It is contemplated that such independently movable stylus members 242A, 242B can be used independently from a tibial dual stylus instrument 200. In other certain exemplary embodiments, such independently movable stylus members 242A, 242B may be used in conjunction with a tibial resection guide assembly, but the exemplary stylus members 242A, 242B having exemplary wide convex stylus tips 239A, 239B can remain independently moveable relative to each other (e.g., the exemplary stylus members 242A, 242B need not be constrained by a pivoting relationship as described in the above example embodiment).

Figure 4:
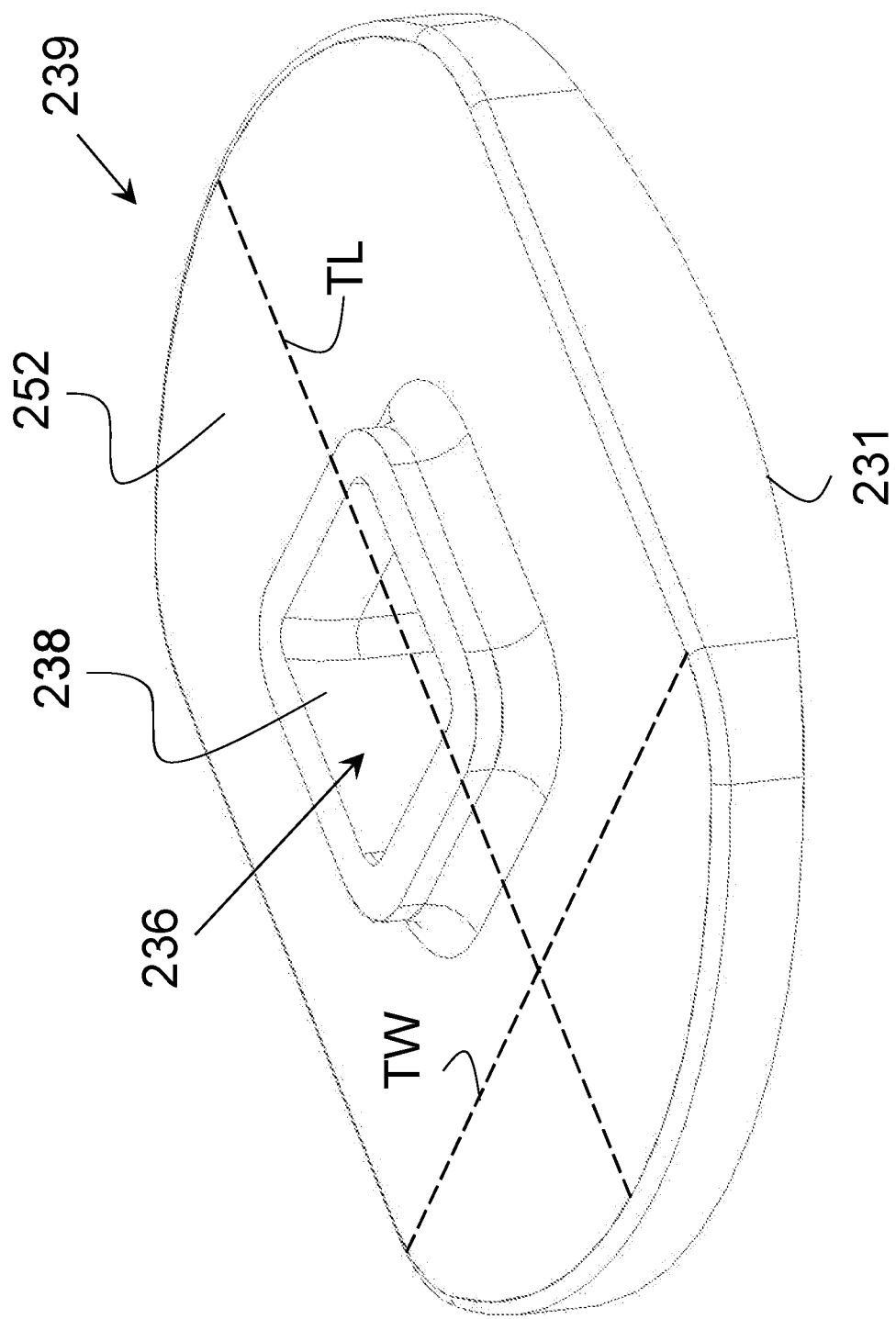
FIG. 4 is a perspective view of an exemplary selectively removable convex stylus tip in accordance with this disclosure in a disengaged position.

FIG. 4 depicts a selectively engageable wide convex stylus tip 239 in a disengaged configuration. It will be appreciated that the exemplary embodiment depicted in FIG. 4 can be representative of a first wide convex stylus tip 239A or a second wide convex stylus tip 239B. A selectively engageable wide convex stylus tip 239 may alternatively be referred to as a "modular wide convex stylus tip" 239 throughout. In the depicted embodiment, the exemplary wide convex stylus tip 239 comprises a tip length TL that extends generally in the anterior-posterior direction when the wide convex stylus tip 239 is disposed on a tibial hemi-plateau. In certain exemplary embodiments, the tip length TL can be at least 9 mm. In other exemplary embodiments, the tip length TL may have a length in the range between 9 mm and 35 mm. In yet other exemplary embodiments, the tip length TL can be at least 20 mm in length. In yet other exemplary embodiments, the tip length TL can be between 21 mm and 24 mm.

The exemplary wide convex stylus tip 239 further comprises a tip width TW that extends generally in the medial-lateral direction when the wide convex stylus tip 239 is disposed on the tibial hemi-plateau. In certain exemplary embodiments, the tip width TW can be at least 9 mm. In other exemplary embodiments, the tip width TW may have a length in the range between 9 mm and 25 mm. In yet other exemplary embodiments, the tip width TW can be at least 15 mm in length. In yet other exemplary embodiments, the tip width TW can be between 15 mm and 19 mm.

It will be appreciated that in certain exemplary embodiments, the tip length TL can be substantially equal to the tip width TW. In certain exemplary embodiments, the tip length TL can be a diameter. In such exemplary embodiments, the top portion 252 into the wide convex stylus tip 239 can be a circle. In exemplary embodiments wherein the tip length TL is a diameter, the convex shape can be a regular convex shape having a generally circular base (i.e., the top portion 252). Such regular convex shapes can comprise by way of example, a hemisphere, a rounded or blunted truncated cone, a series of facet surfaces comprising individual facet surfaces disposed at acute angles relative to adjoining facet surfaces, or combinations thereof.

The selectively engageable wide convex stylus tip 239 further comprises a tip distal surface 231, that has a convex shape. In certain exemplary embodiments, the tip distal surface 231 can have a radius of curvature that is at least 10 mm. In other exemplary embodiments, the radius of curvature can be between 20 mm and 27 mm.

It will further be appreciated that multiple modular wide convex stylus tips can be provided, wherein at least one modular wide convex stylus tip of the multiple modular wide convex stylus tips differs from another modular wide convex stylus tip of the multiple modular wide convex stylus tips in one or more dimensions (e.g., the tip length TL, tip width TW, and/or tip radius of curvature).

A receiving component 236 of a projection-receiver locking arrangement is shown extending through the middle of the top portion 252 of the wide convex tip 239. In the depicted embodiment, the receiving component 236 is defined by inner walls 238 extending through the top portion 252 into the wide convex stylus tip 239 and above the top portion 252 of the wide convex stylus tip 239 to define a lip. A projection component 258 of an example projection-receiver locking arrangement is shown in FIG. 5. In certain exemplary embodiments, the projection component 258 can be a narrow stylus tip. The receiving component 236 is desirably closely fitted to accommodate the projection portion 258 to thereby selectively fixedly engage the wide convex stylus tip 239 to the distal end 247 of a stylus member 242.

Although a projection-receiver locking arrangement is shown, nothing in this disclosure limits the engagement mechanism to be a projection-receiver locking mechanism. Other examples of engagement mechanism include, but are not limited to magnets of opposite polarity, adhesives, or combinations of engagement mechanisms. It is contemplated that by having a selectively engageable wide convex stylus tip 239, a wide convex stylus tip 239 of appropriate size and shape can be selected from a group of multiple selectively engageable wide convex stylus tips 239 to complement a patient's particular anatomy. Furthermore, in embodiments comprising a projection-receiver locking arrangement, either the projection or the receiver component may be provided on the wide convex stylus tip 239, the distal end 247 of the stylus member 242, or combinations thereof. Combinations of multiple projection-receiver locking arrangements are also considered to be within the scope of this disclosure.

It is contemplated that the wide convex stylus tips 239 can be manufactured from stainless steel, cobalt chrome molybdenum alloys, titanium alloys, other durable sterilizable metals or metal alloys, medical grade polyethylene (e.g., ultra-high molecular weight polyethylene ("UHMWPE"), polyether ether ketone ("PEEK"), or other clinically proven biocompatible polymers, ceramic materials, including but not limited to zirconia toughened alumina ("ZTA") ceramics. It is further contemplated that in embodiments wherein the wide convex stylus tips 239 are manufactured from a clinically proven biocompatible polymer, the removable wide convex stylus tips 239 can be single use, disposable items.

FIG. 5 is a perspective view of an exemplary selectively removable wide convex stylus tip 239A of FIG. 4 in an engaged position with the distal end 247 of a stylus member 242. In the depicted embodiment, the stylus member comprises an anteroposterior extension member 275. Close tolerances between the distal end 247 of the stylus member 242 and the inner walls 238 that define the receiving component 236 permit the close fitting of the exemplary selectively removable wide convex stylus tip 239A to the distal end 247 of a stylus member 242 in the engaged position.

Referring back to FIG. 9E and without being bound by theory, it is contemplated that tip width TW, the tip length TL, and the radius of curvature of the convex surface are thought to replicate the corresponding dimensions of the measurement end 26 of the gap measurement instruments 25. It is contemplated that by replicating the contact area of the measurement end 26 of the gap measuring instrument 25 used to measure medial or lateral aspect of the femoral tibial gap as the case may be (i.e., having the contact area of the medial wide convex stylus tip 239 replicate or closely approximate the contact area of the measurement end 26 of the medial gap measurement instrument 25 and/or having the contact area of the lateral wide convex stylus tip 239 replicate or closely approximate the contact area of the measurement end 26 of the lateral gap measurement instrument 25), the exemplary adjustable tibial dual stylus instrument 200 having one or more wide convex stylus tips 239 can more consistently translate medial and lateral measurements of the femoral tibial gap 20 to an angle of the tibial resection slot 321 and thereby the angle of resection of the tibial plateau. Because the femoral component and tibial component of the endoprosthetic implant are disposed upon and closely fitted to the resected surfaces of the fully resected distal femur and the resected proximal tibia respectively, resecting the distal femur and proximal tibia at angles that are measured to replicate the natural joint line angle of the specific patient are thought to position the components of the endoprosthetic implant in a precise orientation that replicates the natural joint of the specific patient undergoing the surgical procedure even though the exemplary wide convex stylus tips 239 disclosed herein may be considered less precise than prior stylets.

Furthermore, it is contemplated that the first pivot point in combination with the second pivot point of the medial stylus and the second pivot point of the lateral stylus, wherein each comprise an anteroposterior extension member 275A, 275B can provide the exemplary adjustable tibial dual stylus instrument 200 sufficient range of pivoting and translating motion to position the medial and lateral wide convex stylus tips 239 in an orientation of the hemi-tibial plateaus that closely replicates the position of the respective measurement ends 26 of the gap measurement instrument 25 when disposed on the respective hemi-tibial plateaus. It will be appreciated that in other exemplary embodiments, the second pivot point can be disposed between the distal end 247A of the anteroposterior extension member 275A and a proximal end of the wide convex stylus tip 239. In still other exemplary embodiments, the adjustable tibial dual stylus instrument 200 can have a second pivot point disposed between the distal end of the measurement member 273A and the proximal end of the anteroposterior extension member 275A as described above and a third pivot point disposed between the distal end of the anteroposterior extension member 275A and a proximal end of the wide convex stylus tip 239. It will also be appreciated that detailed descriptions regarding the first stylus member 242A can also be applied mutatis mutandis to the second stylus member 242B.

Figure 10:
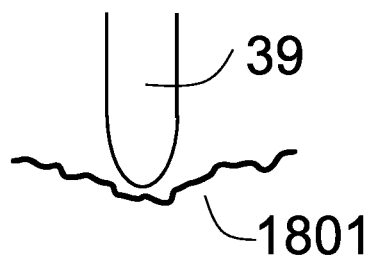
FIG. 10 is a cross-sectional view of a pointed stylus tip.
Figure 11:
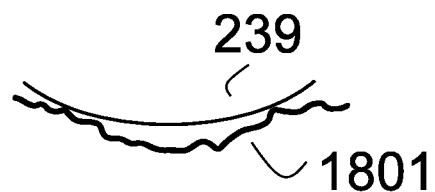
FIG. 11 is a cross-sectional sagittal view of an exemplary wide convex stylus tip.

FIGS. 10 and 11 are close up cross-sections of the distal surfaces of stylus tips relative to the tibial hemi-plateaus 1801 taken along a bisecting sagittal plane. FIG. 10 depicts a pointed stylus tip 39 contacting the deepest surface of the tibial hemi-plateau 1801. FIG. 11 depicts a wide convex stylus tip 239 contacting anterior and posterior points on the tibial hemi-plateau 1801. Without being bound by theory, it is contemplated that a wider stylus tip 239, by contacting a wider area rather than a point like a fine, narrow tip 39, can actually and unexpectedly prevent over- or under-resection of the tibia by more accurately transferring the extension gap measurements. For example, if the medial extension gap 20A were measured with a gap measurement instrument 25 to be 2 mm and if a pointed stylus tip 39 were used, the pointed stylus tip 39 would be placed at the deepest surface of the tibial hemi-plateau 1801 and the proximal end of the measurement member would be set to extend for an 8 mm resection (e.g., a 10 mm endoprosthetic implant minus a 2 mm medial extension gap equals an 8 mm resection). If the deepest point of the tibial hemi-plateau is representative of the tibial hemi-plateau surface, the resection can be accurate. However, if the pointed stylus tip 39 is placed deeper than the representative surface, the tibial hemi-plateau will be over-resected. That is, placing the pointed stylus tip 39 on the deepest surface of the tibial hemi-plateau 1801 may effectively lower the placement of the tibial resection slot 321 relative to the measured points of the tibial hemi-plateau 1801. This lowering of the tibial resection slot 321 can result in over-resection of the proximal tibia 18.

Likewise, if the pointed stylus tip 39 is positioned at a point higher than the representative surface, the tibial hemi-plateau will be under-resected. It is contemplated that a wide convex stylus tip 239 (see FIG. 11) in accordance with this disclosure can more closely transfer the measurements of the extension gap 20 taken from the measurement instruments 25 and thereby avoid the problem of over-resection or under-resection of the proximal tibia 18.

Figure 12A:
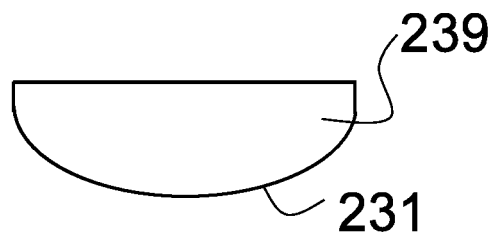
FIG. 12A shows a frontal cross-sectional shape of an exemplary wide convex stylus tip comprising an oblate ellipsoid dome at the tip distal surface.
Figure 12B:
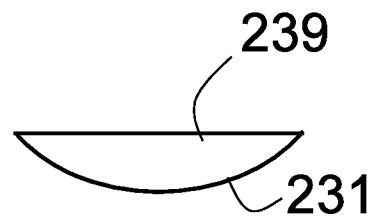
FIG. 12B shows a frontal cross-sectional shape of an exemplary wide convex stylus tip comprising a torispherical dome at the tip distal surface.

FIGS. 12A and 12B are cross-sectional view of exemplary wide convex stylus tips 239 taken along a frontal (also known as a "coronal") plane. It will be appreciated that exemplary wide convex stylus tips 239 may be provided in a variety of shapes and sizes configured to rest upon the majority of a given tibial hemi-plateau 1801. FIG. 12A shows a frontal cross-sectional shape of an exemplary wide convex stylus tip 239 comprising an oblate ellipsoid dome at the tip distal surface 231. FIG. 12B shows a frontal cross-sectional shape of an exemplary wide convex stylus tip 239 comprising a torispherical dome at the tip distal surface 231 having a shallower radius of curvature than the embodiment depicted in FIG. 12A. It will be appreciated that the frontal cross-sectional shape may comprise other convex shapes at the tip distal surface 231. All such convex shapes are considered to be within the scope of this disclosure. Further examples of convex shapes considered to be within the scope of this disclosure include an oblate ellipsoid dome, a torispherical dome, a capsule, series of surfaces, wherein a first surface is disposed at an acute angle relative to an adjacent surface, a hemisphere, an elliptic torus, a torispherical head, or combinations thereof. In certain exemplary embodiments, the surfaces may be planar surfaces. It will be further appreciated that in certain exemplary embodiments, the tip distal surface 231 can comprise a complex surface having multiple areas of convexity and concavity. Patient-specific tip distal surfaces 231P1 (FIG. 16A, 16B) are considered to be within the scope of this disclosure. Furthermore, complex surfaces having a convex profile are considered to be within the scope of this disclosure. In still further exemplary embodiments comprising tip distal surfaces 231 having a complex surface, the convex surface area desirably exceeds the concave surface area.

FIG. 13 is a perspective view of an exemplary tibial dual stylus instrument 200 comprising two further pivot points (i.e., third pivot points), each third pivot point located at the distal ends 247A, 247B of each stylus member 242A, 242B. A fastener 243A, 243B extends through areas defining a hole at the distal end 247A, 247B of each stylus member 242A, 242B. One or more bearings 241A, 241B are disposed between the fastening end of the fastener and the receiving component 236 extending through the top portions 252A, 252B of each wide convex tip 239A, 239B. In other exemplary embodiments, a projection can extend superiorly from the top portion 252A, 252B of one or both wide convex tips 239A, 239B and be closely fitted to and disposed in the hole in the respective distal end 247A, 247B of the accompanying stylus member 242A, 242B. Ball and socket arranges are also considered to be within the scope of this disclosures. Any such arrangement of fastener or other protrusion together with the recess can be said to define a "third pivot point" of the exemplary adjustable tibial dual stylus instrument 200.

In exemplary embodiments, it is contemplated that the first pivot point in combination with the second pivot point and third pivot point of the medial stylus and the lateral stylus can provide the exemplary adjustable tibial dual stylus instrument 200 sufficient range of motion to position the medial and lateral wide convex stylus tips 239 in an orientation of the hemi-tibial plateaus that closely replicates the position of the respective measurement ends 26 of the gap measurement instrument 25 when disposed on the respective hemi-tibial plateaus. In other exemplary embodiments, only the first pivot point and the third pivot point can be present.

Components of an exemplary adjustable tibial dual stylus instrument 200 can be provided in the form of a surgical kit. The components of the kit are preferably arranged in a convenient format, such as in a surgical tray or case. However, the kit components do not have to be packaged or delivered together, provided that they are assembled or collected together in the operating room for use at the time of surgery.

FIG. 14A is a side view of two gap measurement instruments 25A, 25B that may be provided in a surgical kit. The measurement end 26A of a first provided gap measurement instrument 25A can have a first thickness T1. The measurement end 26B of the second provided gap measurement instrument 25B can have a second thickness T2, the second thickness being different from the first thickness T1. In practice, the thicknesses T1, T2, etc. of the respective measurement ends 26A, 26B, etc. of the provided gap measurement instruments 25A, 25B, etc. desirably correspond to incremental changes in a standard unit of measurement (e.g., millimeters) so that when inserted into the femorotibial gap 20 and when creating a tight fit between the distal femur 5 (or trial femoral component) and the proximal tibia 18, the distance between the tensioned distal femur 5 (or femoral component) and the proximal tibia 18 can be readily ascertained.

FIG. 14B is a front view of the measurement ends 26A, 26B of the respective gap measurement instruments 25A, 25B of FIG. 14A. FIG. 14C is a cross-sectional side view of the gap measurement instruments 25A, 25B of FIGS. 14A and 14B taken along the reference line B-B.

Figure 15A:
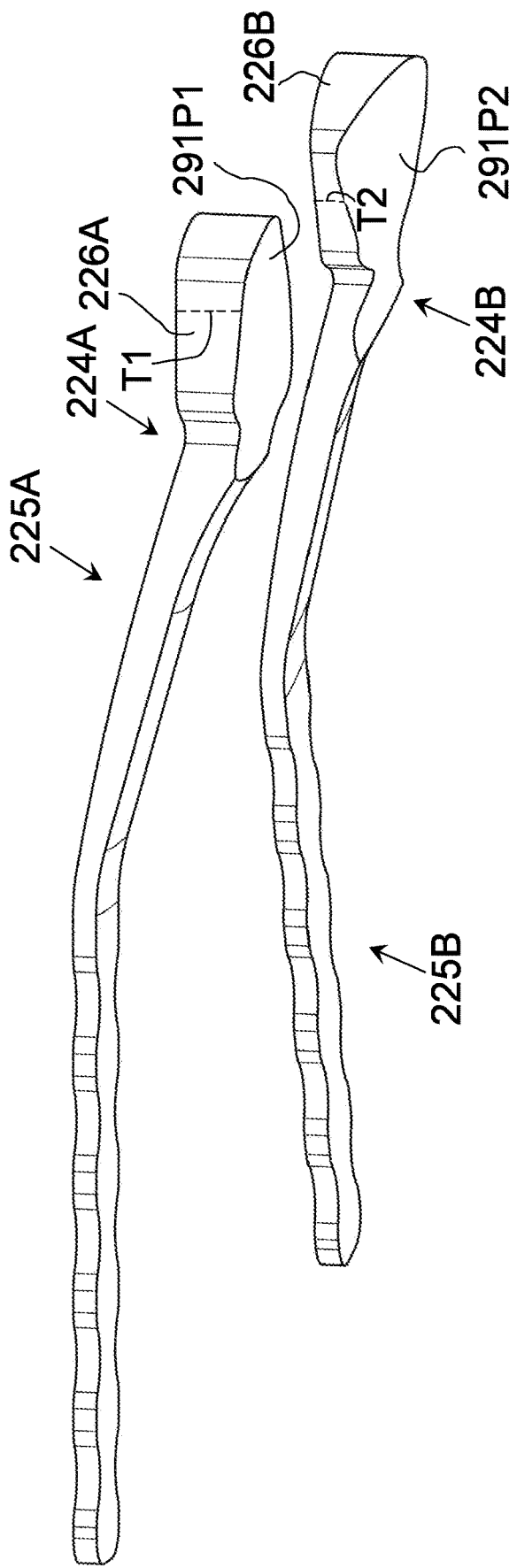
FIG. 15A is a perspective bottom up side view of exemplary gap measurement instruments having respective measurement ends that comprise patient-specific distal measurement surfaces.

FIG. 15A is a perspective bottom up side view of exemplary gap measurement instruments 225A, 225B having respective measurement ends 226A, 226B that comprise patient-specific distal measurement surfaces 291P1, 291P2.

The patient-specific gap measurement instruments 225A, 225B are manufactured using patient-specific data that is derived from the pre-operative planning stage. Pre-operative planners can use CT scans, MRI scans, radiography and algorithms that extract three dimensional data from two dimensional projections, or any other scanning technology that permits persons to map the topography (i.e., the location, shape, size, and distribution) of surface features such as concavities and prominences or the like of the target bone. Using this information and a computer, technicians can create a virtual 3D model of the target bone (e.g., the proximal tibia 18 in this case). This model can be placed in a virtual volume (e.g., a virtual cube encompassing the virtual model).

The model can then be subtracted from the virtual volume to define a negative virtual model having a surface topography that is complementary to the surface topography of the initial virtual model. If the negative model is imported into a computer design program (e.g., a program capable of reading and manipulating .CAD type or other 3D virtual model files), designers can extract sections of the topography of the negative virtual model to place upon the distal end 291 of a virtual model of a measurement end 226 of a patient-specific gap measurement instrument 225 to thereby define a patient-specific distal measurement surface (i.e., 291P1 or 291P2).

U.S. Pat. No. 5,768,134 to Swaelens et. al. and U.S. Pat. No. 9,017,334 to Carroll et. al. further detail improvements to this patient-specific technique, particularly in regard to creating patient-specific instrumentation for orthopedic surgical procedures. The entirety of each patent is incorporated herein by reference.

The measurement end 226A of a first provided patient-specific gap measurement instruments 225A can have a first thickness T1. The measurement end 226B of the second provided gap measurement instrument 225B can have a second thickness T2, the second thickness being different from the first thickness T1. In practice, the thicknesses T1, T2, etc. of the respective measurement ends 226A, 226B, etc. of the provided patient-specific gap measurement instruments 225A, 225B, etc. desirably correspond to incremental changes in a standard unit of measurement (e.g., millimeters) so that when inserted into the femorotibial gap 20 and when creating a tight fit between the distal femur 5 (or trial femoral component) and the proximal tibia 18, the distance between the tensioned distal femur 5 (or femoral component) and the proximal tibia 18 can be readily ascertained.

Figure 15B:
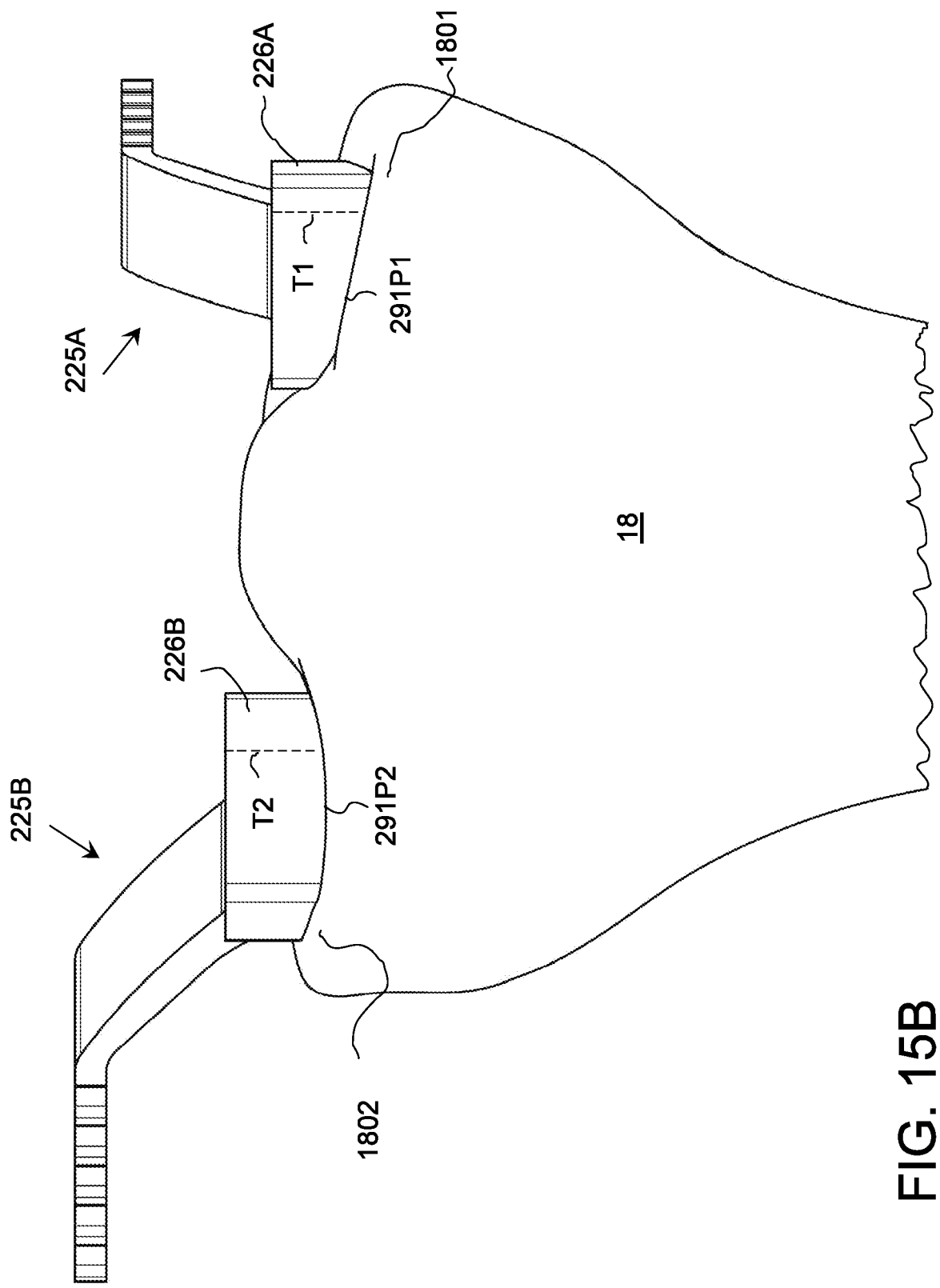
FIG. 15B depicts the exemplary gap measurement instruments disposed in an installed configuration on the patient's specific tibial hemi-plateaus.

Referring to FIG. 15B, these patient-specific distal measurement surfaces 291P1, 291P2 permit surgeons to place these patient-specific distal measurement surfaces 291P1, 291P2 on the tibial hemi-plateaus 1801, 1802 at locations that correspond to the natural surface topography of the target bone when the patient-specific gap measurement instruments 225A, 225B are placed in an installed configuration. The physical patient-specific gap measurement instruments 225A, 225B can then be manufactured from the design files (i.e., virtual model) of the patient-specific gap measurement instruments 225A, 225B having the patient-specific distal measurement surfaces 291P1, 291P2 in the desired locations. In this manner, the described patient-specific distal measurement surfaces 291P1, 291P2 can be said to be "configured for complementary matching with" their indicated set of anatomical surface features (i.e., a specific area of the patient's particular tibial hemi-plateaus 1801, 1802).

Furthermore, it will be appreciated that with patient-specific gap measurement instruments 225A, multiple patient-specific gap measurement instruments 225A having measurement ends 226A of different thicknesses can be provide for each hemicondyle 1801. For example, if multiple patient-specific gap measurement instruments 225A, each having a patient-specific distal measurement surface 291A that is configured for complementary matching with the medial hemicondyle 1801 of a particular patient are provided, at least one such patient-specific gap measurement instrument 225A can have a thickness T1 that differs from the thickness T2 of at least one other such patient-specific gap measurement instrument 225A. In this manner, multiple "sizes" of otherwise similar patient-specific gap measurement instrument 225A can be provided to permit the measurement of the femoral tibial gap 20 as described above.

In exemplary embodiments, it is contemplated that the patient-specific measurement ends 226A, 226B that comprise patient-specific gap measurement instruments 225A, 225B can be modular. In such exemplary embodiments, such patient-specific measurement ends 226A, 226B can be selectively engageable to a handle distal end 224A, 224B, of the patient-specific gap measurement instruments 225A, 225B respectively. It is contemplated that the patient-specific measurement ends 226A, 226B can be selectively engageable to a handle distal end 224A, 224B via mechanical engagement mechanisms, such as a projection-receiver locking mechanism, magnets of opposite polarity, adhesives, or combinations thereof.

It should be noted that the top surfaces of the depicted patient-specific measurement ends 226A, 226B are substantially flat and horizontally disposed when the patient-specific gap measurement instruments 225A, 225B are placed in the installed configuration. In such an embodiment, the femoral trial component 9 of a trial implant is generally not present. Rather, the substantially flat, horizontal top surface of the patient-specific measurement ends 226A, 226B can directly abut the distal resection surface 8. In other exemplary embodiments, the top surfaces of the patient-specific measurement ends 226A, 226B can be curved (see FIGS. 14A-14C) and thereby configured for use with a femoral trial component 9 (see generally FIG. 8).

It is contemplated that patient-specific gap measurement instruments 225A, 225B can be manufactured from stainless steel, cobalt chrome molybdenum alloys, titanium alloys, other durable sterilizable metals or metal alloys, medical grade polyethylene (e.g., ultra-high molecular weight polyethylene ("UHMWPE"), biocompatible medical grade polyamide, polyether ether ketone ("PEEK"), or other clinically proven biocompatible polymers. It is further contemplated that in embodiments wherein the patient-specific measurement ends 226A, 226B are manufactured from a clinically proven biocompatible polymer, the patient-specific measurement ends 226A, 226B can be single use, disposable items. It is still further contemplated that in embodiments wherein the patient-specific gap measurement instruments 225A, 225B are manufactured from a clinically proven biocompatible polymer, the patient-specific gap measurement instruments 225A, 225B can be single use, disposable items.

The exemplary patient-specific gap measurement instruments 225A, 225B can be provided in a kit, wherein a first patient-specific gap measurement instrument 225A has a first measurement end 226A having a first thickness T1 and a second patient-specific gap measurement instrument 225B has a second measurement end 226B having a second thickness T2, wherein the second thickness T2 is different from the first thickness T1. It is contemplated that surgeons can use these exemplary patient-specific gap measurement instruments 225A, 225B to balance the knee in the manner described above.

Figure 16A:
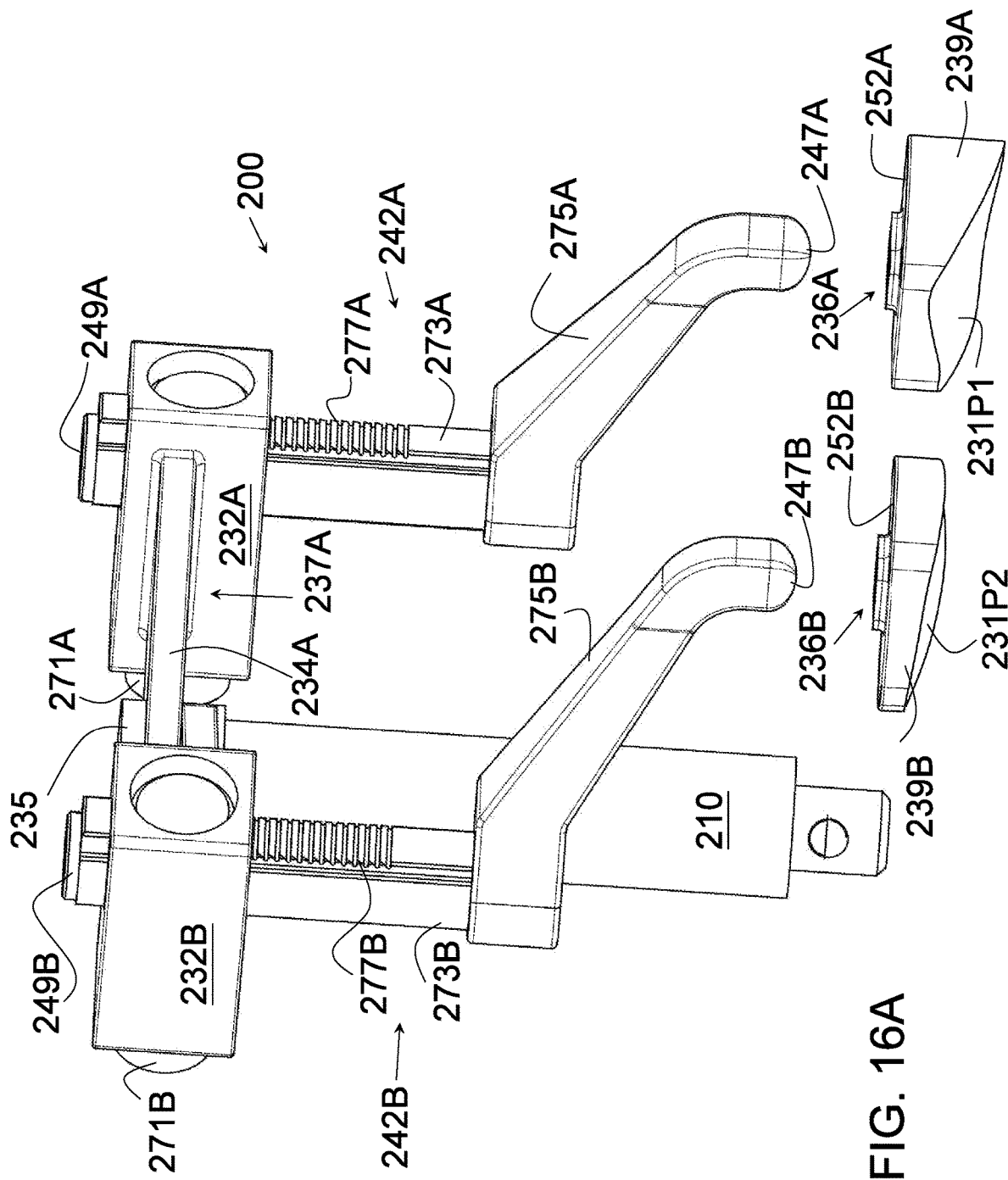
FIG. 16A is a partially exploded view of an exemplary tibial dual stylus instrument having selectively engageable wide convex stylus tips, wherein the distal surfaces of the wide convex stylus tips have a patient-specific topography that is complementary to the surface topography of the patient's specific tibial hemi-plateaus.

FIG. 16A is a partially exploded view of an exemplary tibial dual stylus instrument having selectively engageable wide convex stylus tips 239A, 239B, wherein the tip distal ends 231P1, 231P2 of the wide convex stylus tips 239A, 239B have a patient-specific topography that is complementary to the surface topography of the patient's specific tibial hemi-plateaus 1801, 1802.

Similarly to the patient-specific gap measurement instruments 225A, 225B described supra, the patient-specific tip distal ends 231P1, 231P2 of the exemplary wide convex stylus tips 239A, 239B are manufactured using patient-specific data that is derived from the pre-operative planning stage. CT scans, MRI scans, radiography and algorithms that extract three dimensional data from two dimensional projections, or any other scanning technology that permits persons to map the topography (i.e., the location, shape, size, and distribution) of surface features such as concavities and prominences or the like of the target bone can be used to map the topography of the target area. Using this information and a computer, technicians can create a virtual 3D model of the target bone (e.g., the proximal tibia 18 in this case). This model can be placed in a virtual volume (e.g., a virtual cube encompassing the virtual model).

The model can then be subtracted from the virtual volume to define a negative virtual model having a surface topography that is complementary to the surface topography of the initial virtual model. If the negative model is imported into a computer design program (e.g., a program capable of reading and manipulating .CAD type or other 3D virtual model files), designers can extract sections of the topography of the negative virtual model to place upon the tip distal surfaces 231P1, 231P2 of a virtual model of exemplary wide convex stylus tips 239A, 239B to thereby define a patient-specific exemplary wide convex stylus tip 239A, 239B.

Figure 16B:
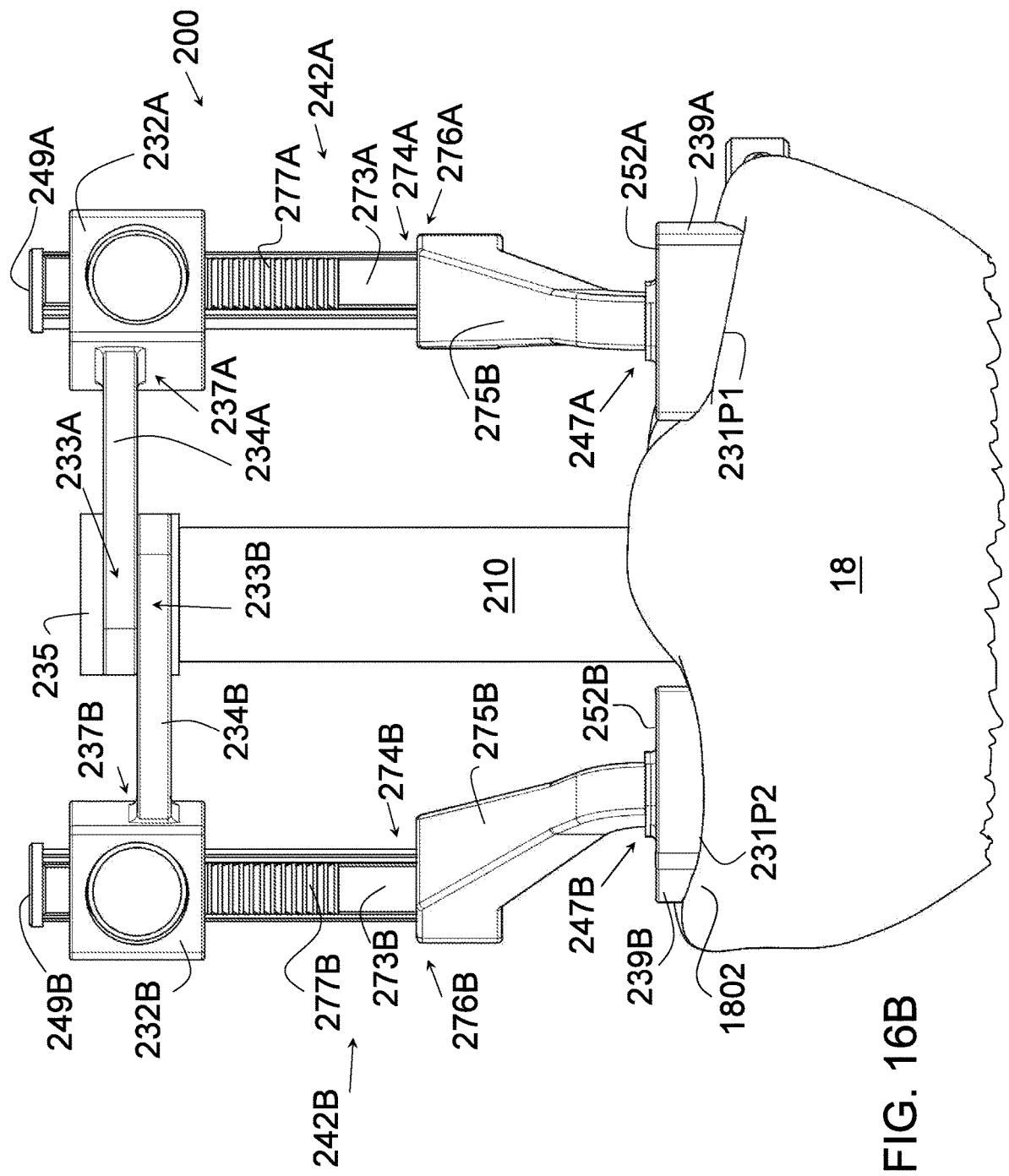
FIG. 16B is a posterior view of the exemplary tibial dual stylus instrument of FIG. 16A in an assembled and installed configuration.

FIG. 16B is a posterior view of the exemplary tibial dual stylus instrument 200 of FIG. 16A in an assembled and installed configuration. As shown, these patient-specific wide convex stylus tip 239A, 239B permit surgeons to place the patient-specific tip distal surfaces 231P1, 231P2 on the exposed tibial hemi-plateaus 1801, 1802 at locations that correspond to the natural surface topography of the target bone when the patient-specific wide convex stylus tip 239A, 239B are placed in an installed configuration. The physical patient-specific wide convex stylus tip 239A, 239B can then be manufactured from the design files (i.e., virtual model) of the patient-specific wide convex stylus tip 239A, 239B having the patient-specific tip distal surfaces 231P1, 231P2 in the desired locations. In this manner, the described patient-specific tip distal surfaces 231P1, 231P2 can be said to be "configured for complementary matching with" their indicated set of anatomical surface features (i.e., a specific area of the patient's particular tibial hemi-plateaus 1801, 1802).

It is contemplated that that exemplary patient-specific wide convex stylus tip 239A, 239B, when used with the exemplary tibial dual stylus instrument 200 and in conjunction with the exemplary patient-specific gap measurement instruments 225A, 225B, can more accurately transfer the measurements of the femoral tibial gap 20 to the angle of tibial resection than was previously possible.

It will be appreciated that in exemplary embodiments, the patient-specific tip distal surfaces 231P1, 231P2 can further comprise a convex shape. The convex shape can consist essentially of shapes selected from the following groups of shape: an oblate ellipsoid dome, a torispherical dome, a series of surfaces, wherein a first surface is disposed at an acute angle relative to an adjacent surface, a capsule, an elliptic torus, a hemisphere, a torispherical head, and combinations thereof. It will further be appreciated that in some embodiments comprising a patient-specific tip distal surface 231P1, the patient-specific surface may comprise only a portion of the tip distal surface 231P1.

An exemplary kit can include any suitable embodiment of an exemplary adjustable tibial dual stylus instrument 200, variations of the exemplary adjustable tibial dual stylus instruments 200 described herein, and any other exemplary adjustable tibial dual stylus instruments 200 according to an embodiment. While it is contemplated that an exemplary kit may include one or more modular wide convex stylus tips 239, one or more tibial dual stylus instruments 200, one or more stylus members 242A, 242B, and one or more patient-specific gap measurement instruments 225A, 225B, it will be appreciated that certain kits may lack some or all of these elements.

Any suitable embodiment of a modular convex stylus tip 239, variations of the modular wide convex stylus tips 239 described herein, and any other modular wide convex stylus tip 239 according to an embodiment are considered to be within the scope of this disclosure. Any suitable embodiment of a tibial dual stylus instrument 200, variations of tibial dual stylus instruments 200 described herein, and any other tibial dual stylus instrument 200 according to an embodiment are considered to be within the scope of this disclosure. Any suitable embodiment of a stylus member 242A, 242B, variations of the stylus members 242A, 242B described herein, and any other stylus member 242A, 242B according to an embodiment are considered to be within the scope of this disclosure. Any suitable embodiment of a patient-specific gap measurement instrument 225, variations of the patient-specific gap measurement instruments 225A, 225B described herein, and any other patient-specific gap measurement instrument 225 according to an embodiment are considered to be within the scope of this disclosure.

Selection of a suitable number or type of modular wide convex stylus tip 239, tibial dual stylus instrument 200, stylus member 242A, 242B, and patient-specific gap measurement instrument 225 to include in a kit according to a particular embodiment can be based on various considerations, such as the procedure intended to be performed using the components included in the kit.

An exemplary wide convex stylus tip for a surgical instrument comprises: a length, a width, and a tip distal surface, wherein the tip distal surface has a convex shape.

In certain exemplary embodiments, the wide convex stylus tip has a length that is at least 9 mm. In certain exemplary embodiments, the length of the wide convex stylus tip is a diameter. In certain exemplary embodiments, the width of the wide convex stylus tip is at least 9 mm. In certain exemplary embodiments, the tip distal surface of the wide convex stylus tip has the curvature of a distal femoral condyle.

In certain exemplary embodiments of the wide convex stylus tip, the tip distal surface is selected from a shape consisting essentially of: an oblate ellipsoid dome, a torispherical dome, a series of surfaces, wherein a first surface is disposed at an acute angle relative to an adjacent surface, a capsule, an elliptic torus, a hemisphere, a torispherical head, and combinations thereof.

In certain exemplary embodiments, of the wide convex stylus tip, the tip distal surface has a radius of curvature of at least 10 mm.

In certain exemplary embodiments of the wide convex stylus tip, the tip distal surface has a radius of curvature in the range of about 19 mm to about 27 mm. In certain exemplary embodiments of the wide convex stylus tip, the tip distal surface has a radius of curvature of about of about 21 mm to about 25 mm. In certain exemplary embodiments of the wide convex stylus tip, the length of the wide convex stylus tip is between about 18 mm and about 26 mm. In certain exemplary embodiments of the wide convex stylus tip, the length of the wide convex stylus tip is between about 20 mm and about 24 mm. In certain exemplary embodiments of the wide convex stylus tip, the width of the wide convex stylus tip is between about 13 mm and about 21 mm. In certain exemplary embodiments of the wide convex stylus tip, the width of the wide convex stylus tip is between about 15 mm and about 19 mm.

An exemplary tibial-referencing surgical stylus comprises: a stylus member having a proximal end and a distal end, the distal end distally disposed from the proximal end; and a wide convex stylus tip comprising: a length, a width, and a tip distal surface, wherein the tip distal surface has a convex shape.

In certain exemplary embodiments of the tibial-referencing surgical stylus, the tip distal surface is selected from the shape consisting essentially of: an oblate ellipsoid dome, a torispherical dome, a series of surfaces, wherein a first surface is disposed at an acute angle relative to an adjacent surface, a capsule, an elliptic torus, a hemisphere, a torispherical head, and combinations thereof.

An exemplary adjustable knee arthroplasty tibial dual stylus instrument comprises: a body member having a height; a first stylus support member having a first area defining a first cavity extending therethrough, and a first support arm extending from the first stylus support member, wherein the first support arm is in pivoting relationship with the body member; a second stylus support member having a second area defining a second cavity extending therethrough and second support arm extending from the second stylus support member, wherein the second support arm is in pivoting relationship with the first support arm; a first stylus member extending through the first cavity, wherein the first stylus member comprises a first wide convex stylus tip at a first distal end of the first stylus member, wherein the first wide convex stylus tip comprises: a first tip length, a first tip width, and a first tip distal surface, wherein the first tip distal surface has a first convex shape, wherein the first tip length is measured along a first transverse plane, and, wherein the first tip length is at least 9 mm; and a second stylus member extending through the second cavity, wherein the second stylus member comprises a second wide convex stylus tip at a second distal end of the second stylus member, wherein the second wide convex stylus tip comprises: a second tip length, a second tip width, and a second tip distal surface, wherein the second tip distal surface has a second convex shape, wherein the second tip length is measured along the first transverse plane, and, wherein the second tip length is at least 9 mm.

An exemplary adjustable knee arthroplasty tibial dual stylus instrument comprises: a body member having a height; a first stylus support member having a first area defining a first cavity extending therethrough, and a first support arm extending from the first stylus support member, wherein the first support arm is in pivoting relationship with the body member; a second stylus support member having a second area defining a second cavity extending therethrough and second support arm extending from the second stylus support member, wherein the second support arm is in pivoting relationship with the first support arm; a first stylus member extending through the first cavity, wherein the first stylus member comprises a first wide convex stylus tip at a first distal end of the first stylus member, wherein the first wide convex stylus tip comprises: a first tip length, a first tip width, and a first tip distal surface, wherein the first tip distal surface has a first convex shape, and wherein the first tip length and the first tip width are greater than a first stylus member minimum length or a first stylus member minimum width taken along a first transverse plane; and a second stylus member extending through the second cavity, wherein the second stylus member comprises a second wide convex stylus tip at a second distal end of the second stylus member, wherein the second wide convex stylus tip comprises: a second tip length, a second tip width, and a second tip distal surface, wherein the second tip distal surface has a second convex shape, and wherein the second tip length and the first tip width are greater than a second stylus member minimum length or a second stylus member minimum width taken along a second transverse plane.

An exemplary adjustable knee arthroplasty tibial dual stylus instrument comprises: a body member having a height; a first stylus support member having a first area defining a first cavity extending therethrough, and a first support arm extending from the first stylus support member, wherein the first support arm is in pivoting relationship with the body member; a second stylus support member having a second area defining a second cavity extending therethrough and second support arm extending from the second stylus support member, wherein the second support arm is in pivoting relationship with the first support arm; a first stylus member extending through the first cavity, wherein the first stylus member comprises a first wide convex stylus tip at a first distal end of the first stylus member, wherein the first wide convex stylus tip comprises: a first tip length, a first tip width, and a first tip distal surface, wherein the first tip distal surface has a first radius of curvature of at least 10 mm, wherein the first tip length is measured along a first transverse plane, and, wherein the first tip length is at least 9 mm; and a second stylus member extending through the second cavity, wherein the second stylus member comprises a second wide convex stylus tip at a second distal end of the second stylus member, wherein the second wide convex stylus tip comprises: a second tip length, a second tip width, and a second tip distal surface, wherein the second tip distal surface has a second radius of curvature of at least 10 mm, wherein the second tip length is measured along the first transverse plane, and, wherein the second tip length is at least 9 mm.

In certain exemplary embodiments of an adjustable knee arthroplasty tibial dual stylus instrument, the first convex stylus tip has a first frontal cross-sectional shape, wherein the first frontal cross-sectional shape at the first tip distal surface comprises a shape that is selected from a group consisting essentially of: an oblate ellipsoid dome, a torispherical dome, a series of surfaces, wherein a first surface is disposed at an acute angle relative to an adjacent surface, a capsule, an elliptic torus, a torispherical head, and combinations thereof.

In certain exemplary embodiments of an adjustable knee arthroplasty tibial dual stylus instrument, the second convex stylus tip has a second frontal cross-sectional shape, wherein the second frontal cross-sectional shape at the second tip distal surface comprises a shape that is selected from a group consisting essentially of: an oblate ellipsoid dome, a torispherical dome, a series of surfaces, wherein a first surface is disposed at an acute angle relative to an adjacent surface, a capsule, an elliptic torus, a torispherical head, and combinations thereof.

In certain exemplary embodiments of an adjustable knee arthroplasty tibial dual stylus instrument, the first stylus member is arranged in a pivoting relationship relative to a first stylus support member.

In certain exemplary embodiments of an adjustable knee arthroplasty tibial dual stylus instrument, the second stylus member is arranged in a pivoting relationship relative to a second stylus support member.

In certain exemplary embodiments of an adjustable knee arthroplasty tibial dual stylus instrument, the first stylus member is arranged in a translating relationship relative to a body member.

In certain exemplary embodiments of an adjustable knee arthroplasty tibial dual stylus instrument, the second stylus member is arranged in a translating relationship relative to a body member.

In certain exemplary embodiments of an adjustable knee arthroplasty tibial dual stylus instrument, the first stylus member further comprises: a measurement member having a measurement member proximal end distally disposed from a measurement member distal end, wherein the measurement member extends through the first cavity, and an anteroposterior extension member having an anteroposterior extension member proximal end distally disposed from an anteroposterior extension member distal end, the anteroposterior proximal end engaging the measurement member distal end, wherein the first distal end of the first stylus member is the anteroposterior extension member distal end.

In certain exemplary embodiments of an adjustable knee arthroplasty tibial dual stylus instrument, the anteroposterior member proximal end is in pivoting relationship with the measurement member distal end to define a second pivot point.

In certain exemplary embodiments of an adjustable knee arthroplasty tibial dual stylus instrument, the first support arm in pivoting relationship with the body member defines a first pivot point, and wherein the first wide convex stylus tip is in a pivoting and translating relationship relative to the body member by means of the first pivot point and the second pivot point.

In certain exemplary embodiments of an adjustable knee arthroplasty tibial dual stylus instrument, the first distal end of the first stylus member is in pivoting relationship with a proximal end of the first wide convex stylus tip to define a third pivot point.

In certain exemplary embodiments of an adjustable knee arthroplasty tibial dual stylus instrument, the second stylus member further comprises: a measurement member having a measurement member proximal end distally disposed from a measurement member distal end, wherein the measurement member extends through the second cavity, and an anteroposterior extension member having an anteroposterior extension member proximal end distally disposed from an anteroposterior extension member distal end, the anteroposterior proximal end engaging the measurement member distal end, wherein the second distal end of the second stylus member is the anteroposterior extension member distal end.

In certain exemplary embodiments of an adjustable knee arthroplasty tibial dual stylus instrument, the anteroposterior member proximal end is in pivoting relationship with the measurement member distal end to define a second pivot point.

In certain exemplary embodiments of an adjustable knee arthroplasty tibial dual stylus instrument, the second support arm in pivoting relationship with the body member defines a first pivot point, and wherein the second wide convex stylus tip is in a pivoting and translating relationship relative to the body member by means of the first pivot point and the second pivot point.

In certain exemplary embodiments of an adjustable knee arthroplasty tibial dual stylus instrument, the second distal end of the second stylus member is in pivoting relationship with a proximal end of the second wide convex stylus tip to define a third pivot point.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. An adjustable knee arthroplasty tibial dual stylus instrument comprising:
   a body member having a height;
   a first stylus support member having a first area defining a first cavity extending therethrough, and a first support arm extending from the first stylus support member, wherein the first support arm is in pivoting relationship with the body member to define a first pivot point of a first stylus member subassembly;
   a second stylus support member having a second area defining a second cavity extending therethrough and a second support arm extending from the second stylus support member, wherein the second support arm is in pivoting relationship with the first support arm to define a first pivot point of a second stylus member subassembly;
   a first stylus member extending through the first cavity, wherein the first stylus member comprises:
   a measurement member having a measurement member proximal end proximally disposed from a measurement member distal end, wherein the measurement member extends through the first cavity,
   an anteroposterior extension member having an anteroposterior extension member proximal end proximally disposed from an anteroposterior extension member distal end, the anteroposterior extension member proximal end engaging the measurement member distal end, wherein the first distal end of the first stylus member is the anteroposterior extension member distal end, and wherein the anteroposterior extension member proximal end is in pivoting relationship with the measurement member distal end to define a second pivot point of the first stylus member subassembly, and
   a first wide convex stylus tip at a first distal end of the first stylus member,
   wherein the first wide convex stylus tip comprises:
   a first tip length,
   a first tip width, and
   a first tip distal surface,
   wherein the first tip distal surface has a first convex shape,
   wherein the first tip length is measured along a first transverse plane, and,
   wherein the first tip length is at least 9 mm, and wherein the first wide convex stylus tip is in a pivoting and translating relationship relative to the body member by means of the first pivot point of the first stylus member subassembly and the second pivot point of the first stylus member subassembly; and a second stylus member extending through the second cavity, wherein the second stylus member comprises:

a second measurement member having a second measurement member proximal end proximally disposed from a second measurement member distal end, wherein the second measurement member extends through the second cavity, a second anteroposterior extension member having a second anteroposterior extension member proximal end proximally disposed from an anteroposterior extension member distal end, the anteroposterior extension member proximal end engaging the measurement member distal end, wherein the second distal end of the second stylus member is the anteroposterior extension member distal end, and wherein the anteroposterior extension member proximal end is in pivoting relationship with the measurement member distal end to define a second pivot point of the second stylus member subassembly, and a second wide convex stylus tip at a second distal end of the second stylus member, wherein the second wide convex stylus tip comprises:
a second tip length,
a second tip width, and
a second tip distal surface,
wherein the second tip distal surface has a second convex shape,
wherein the second tip length is measured along the first transverse plane, and,
wherein the second tip length is at least 9 mm, and wherein the second wide convex stylus tip is in a pivoting and translating relationship relative to the body member by means of the first pivot point of the second stylus member subassembly and the second pivot point of the second stylus member subassembly.

2. The adjustable knee arthroplasty tibial dual stylus instrument of claim 1, wherein the first wide convex stylus tip has a first frontal cross-sectional shape, wherein the first frontal cross-sectional shape at the first tip distal surface comprises a shape that is selected from a group consisting essentially of: an oblate ellipsoid dome, a torispherical dome, a series of surfaces, wherein a first surface is disposed at an acute angle relative to an adjacent surface, a capsule, an elliptic torus, a torispherical head, and combinations thereof.

3. The adjustable knee arthroplasty tibial dual stylus instrument of claim 1, wherein the second wide convex stylus tip has a second frontal cross-sectional shape, wherein the second frontal cross-sectional shape at the second tip distal surface comprises a shape that is selected from a group consisting essentially of: an oblate ellipsoid dome, a torispherical dome, a series of surfaces, wherein a first surface is disposed at an acute angle relative to an adjacent surface, a capsule, an elliptic torus, a torispherical head, and combinations thereof.

4. The adjustable knee arthroplasty tibial dual stylus instrument of claim 1, wherein the first stylus member is arranged in a pivoting relationship relative to the first stylus support member.

5. The adjustable knee arthroplasty tibial dual stylus instrument of claim 1, wherein the second stylus member is arranged in a pivoting relationship relative to the second stylus support member.

6. The adjustable knee arthroplasty tibial dual stylus instrument of claim 1, wherein the first stylus member is arranged in a translating relationship relative to the body member.

7. The adjustable knee arthroplasty tibial dual stylus instrument of claim 1, wherein the second stylus member is arranged in a translating relationship relative to the body member.

8. The adjustable knee arthroplasty tibial dual stylus instrument of claim 1, wherein the first distal end of the first stylus member is in pivoting relationship with a proximal end of the first wide convex stylus tip to define a third pivot point.

9. The adjustable knee arthroplasty tibial dual stylus instrument of claim 1, wherein the second distal end of the second stylus member is in pivoting relationship with a proximal end of the second wide convex stylus tip to define a third pivot point of the second stylus member assembly.

* * * * *